(12) United States Patent
Takihara

(10) Patent No.: US 6,253,114 B1
(45) Date of Patent: Jun. 26, 2001

(54) ELECTRONIC DEVICE CONTROLLER

(75) Inventor: Masahiro Takihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/089,653

(22) Filed: Jun. 3, 1998

(30) Foreign Application Priority Data

Jun. 5, 1997 (JP) .................................................. 9-147528

(51) Int. Cl.$^7$ .................................................. G05B 15/00
(52) U.S. Cl. .................................. 700/83; 700/17; 700/94
(58) Field of Search ............................. 700/11, 17, 19, 700/94, 83

(56) References Cited

U.S. PATENT DOCUMENTS

| | | | |
|---|---|---|---|
| 4,652,874 | 3/1987 | Loyer | 370/451 |
| 4,723,120 | 2/1988 | Petty, Jr. | 340/825.2 |
| 4,903,016 | 2/1990 | Murai et al. | 340/825.07 |
| 5,007,051 | 4/1991 | Dolkas et al. | 370/235 |
| 5,400,246 | 3/1995 | Wilson et al. | 700/17 |
| 5,418,527 | 5/1995 | Yashiro | 340/825.24 |
| 5,420,724 | 5/1995 | Kawamura et al. | 360/13 |
| 5,455,569 | 10/1995 | Sherman et al. | 340/825.02 |
| 5,475,835 | 12/1995 | Hickey | 707/104 |

(List continued on next page.)

FOREIGN PATENT DOCUMENTS

| | | |
|---|---|---|
| 3151492 A1 | 7/1983 | (DE) . |
| 0371719 A3 | 6/1990 | (EP) . |
| 0573204 A2 | 12/1993 | (EP) . |
| 0626635 A2 | 11/1994 | (EP) . |
| 0637157 A2 | 2/1995 | (EP) . |
| 0727729 A1 | 8/1996 | (EP) . |
| 4-97468 | 3/1992 | (JP) . |
| 7-134628 | 5/1995 | (JP) . |
| 96/07971 | 3/1996 | (WO) . |

OTHER PUBLICATIONS

IEEE Standard for a High Performance Serial Bus, IEEE Computer Society, Std. 1394, Aug. 30, 1996.
D. Bursky, "Networking Scheme Exploits Existing RS–232 Interfaces," Electronic Design, May 28, 1987, No. 13, pp. 65–66 & 68.
A. Gefrides et al., "Standard Bus Connects Up to 126 Peripherals: Plug and Play with USB," Applications Connectors, May 1996, No. 3, pp. 36–38.
G. Hoffman et al., "IEEE 1394: A Ubiquitous Bus," IEEE, May 3, 1995, pp. 334–338.

*Primary Examiner*—William Grant
*Assistant Examiner*—Paul Rodriguez
(74) *Attorney, Agent, or Firm*—Oblon, Spivak, McClelland, Maier & Neustadt, P.C.

(57) ABSTRACT

The present invention relates to a technique to realize the copying operation without any deterioration of information by simplified operation on the occasion of copying information to a plurality of recording media from a source medium. A PC module registers an MD player module and a DAT player module as one group, then produces a unique group ID to this group and notifies this group ID to the MD player module and DAT player module. On the occasion of copying information to this group from the CD player module, the PC module adds the group ID and recording instruction to the reproduction instruction for the CD player module and then transmits the data to the 1394-cable. The CD player module which has received a command starts reproducing operation and transmits again the remaining part from which the command for own device is deleted to the 1394-cable. The MD player module and DAT player module recognize by the group ID that this command is directed to own device and record the information reproduced by the CD player module depending on the recording instruction.

18 Claims, 28 Drawing Sheets

U.S. PATENT DOCUMENTS

| | | | |
|---|---|---|---|
| 5,481,750 | * | 1/1996 | Parise et al. ............................ 709/220 |
| 5,515,211 | | 5/1996 | Kawamura ............................. 386/54 |
| 5,537,605 | * | 7/1996 | Teece ...................................... 712/1 |
| 5,539,390 | | 7/1996 | Nagano et al. ................. 340/825.07 |
| 5,563,886 | | 10/1996 | Kawamura et al. .................. 370/257 |
| 5,621,659 | | 4/1997 | Matsumoto et al. ............ 340/825.08 |
| 5,631,850 | | 5/1997 | Tanaka et al. ....................... 702/122 |
| 5,640,392 | | 6/1997 | Hayashi ................................ 370/395 |
| 5,657,221 | * | 8/1997 | Warman et al. ....................... 700/83 |
| 5,687,334 | | 11/1997 | Davis et al. ......................... 345/339 |
| 5,689,244 | | 11/1997 | Iijima et al. .................... 340/825.07 |
| 5,710,773 | | 1/1998 | Shiga ................................... 370/512 |
| 5,712,834 | | 1/1998 | Nagano et al. ........................ 369/19 |
| 5,729,717 | | 3/1998 | Tamada et al. ...................... 711/164 |
| 5,778,064 | | 7/1998 | Kori et al. ........................... 380/203 |
| 5,787,259 | * | 7/1998 | Haroun et al. ....................... 709/253 |
| 5,790,876 | | 8/1998 | Shima et al. ......................... 713/320 |
| 5,793,366 | * | 8/1998 | Mano et al. ......................... 345/329 |
| 5,815,631 | | 9/1998 | Sugiyama et al. ..................... 386/46 |
| 5,847,771 | | 12/1998 | Cloutier et al. ...................... 348/564 |
| 5,850,573 | | 12/1998 | Wada ..................................... 710/62 |
| 5,875,108 | | 2/1999 | Hoffberg et al. ...................... 700/17 |
| 5,883,621 | * | 3/1999 | Iwamura ............................... 725/37 |
| 5,887,193 | | 3/1999 | Takahashi et al. ....................... 710/8 |
| 5,963,450 | | 10/1999 | Dew ..................................... 700/169 |
| 5,971,581 | * | 10/1999 | Gretta et al. ........................... 700/83 |
| 5,973,748 | | 10/1999 | Horiguchi et al. .................. 348/554 |
| 5,987,126 | | 11/1999 | Okuyama et al. ................... 380/203 |

\* cited by examiner

FIG. 10

| FUNCTION | CD DRIVE |
|---|---|
| INPUT FORMAT | PCM DATA |
| OUTPUT FORMAT | PCM DATA |

FIG. 11

| FUNCTION | MD DRIVE | ATRAC ENCODER | ATRAC DECODER |
|---|---|---|---|
| INPUT FORMAT | DIGITAL DATA | PCM DATA | ATRAC DATA |
| OUTPUT FORMAT | DIGITAL DATA | ATRAC DATA | PCM DATA |

FIG. 12

| FUNCTION | DAT DRIVE |
|---|---|
| INPUT FORMAT | PCM DATA |
| OUTPUT FORMAT | PCM DATA |

FIG. 22

| EQUIPMENT NAME | NODE ID | DEVICE ID | GROUP ID |
|---|---|---|---|
| PC MODULE 1 | 0 | 100 | |
| CD PLAYER MODULE 2 | 1 | 101 | |
| MD PLAYER MODULE 3 | 2 | 102 | 200 |
| MD PLAYER MODULE 4 | 3 | 103 | |
| DAT PLAYER MODULE 5 | 4 | 104 | 200 |

ELECTRONIC DEVICE CONTROLLER

BACKGROUND OF THE INVENTION

1. Field of the Invention

The present invention relates to an electronic device controller.

2. Description of the Related Art

On the occasion of copying information to another recording medium from a certain source medium, when there are provided a plurality of recording media, a method has been employed to distribute adequately the analog signal output from the source medium to a recording medium using, for example, an AV (Audio Visual) amplifier.

However, this method has a problem that even when source media and recording media are capable of processing digital signals, information is necessarily deteriorated because the information which is once converted to an analog signal is converted again to the digital signal for the recording.

Moreover, there has been a problem that operations are very troublesome because the operations for reproducing source media and operations for recording recording media must be respectively done manually.

Therefore, it can also be thought that an AV amplifier and source media and recording media are mutually connected with a connecting line which can transmit and receive a control signal such as Control-A1 and each medium is controlled with the AV amplifier.

However, such method has a problem that running cost becomes high because a new connecting line is required but the wiring becomes troublesome.

The present invention has been proposed considering the background explained above and enables, on the occasion of copying information to a plurality of recording media from source media, the copying with simplified operations without deteriorating the information.

SUMMARY OF THE INVENTION

An electronic device controller of the present invention is characterized in comprising a communication means for making communication with an electronic device via a network, a requesting means for requesting, to an electronic device, transmission of information in unit of function providing at least one of the input and output of the electronic device, a first memory means for storing the information in unit of function transmitted from the electronic device via the network, a forming means for forming a function group by combining one or more function units being stored in the first memory means and a second memory means for storing information of function group formed by the forming means.

In the electronic device controller, electronic device control method and transmission medium described in this specification of the present invention, communication with an electronic device is conducted via a network, transmission of the information in unit of function providing at least one of the input and output of the electronic device is requested to the electronic device, the information in unit of function transmitted via the network from the electronic device is stored, a function group is formed by summarizing one or more function units stored and the information of the function group formed is also stored. For example, communication is made with the electronic device via the 1394 networks, transmission of the information of the input/output format in the function unit providing at least one of the input and output of the electronic device is requested to the electronic device, information in the function unit transmitted via the network from the electronic device is stored, a function group is formed by combining one or more function units being stored and information of the function group formed is stored.

In the electronic device, electronic device control method and transmission medium described in the specification of the present invention, communication with the electronic device controller is conducted via the network, information in the function unit having at least one of the input and output thereof is stored, information in the function unit is transmitted to the electronic device controller when the request for transmission of information of function unit is received from the electronic device controller and information of the function group is stored when the information of the function group belonging thereto received. For example, communication with the electronic device controller such as a personal computer is conducted via the 1394-network, the information in function unit provided with at least one of the input and output thereof is stored, the information in the function unit is transmitted to the electronic device controller when request for transmission of the information in the function unit is received from the electronic device controller and the information of the function group is stored when the information of the function group belonging thereto is received.

Moreover, in the electronic device controller, electronic device control method and transmission medium described in the specification of the present invention, a first electronic device makes communications with a second electronic device via a network, requests, to the second electronic device, transmission of the information in the function unit having at least one of the input and output of the first electronic device, stores the information in the function unit transmitted from the second electronic device via the network, forms a function group by combining one or more function units stored and stores the information of the function group formed, while the second electronic device makes communication with the first electronic device via the network, stores the information in the function unit having at least one of the input and output thereof, transmits the information in the function unit to the first electronic device when request for transmission of the information in the function unit is received from the first electronic device and stores the information of the function group when the information of the function group belonging thereto is received. For example, the first electronic device which is a personal computer makes communication with a second electronic device as an AV apparatus via the network, request, to the second electronic device, transmission of information in the function unit having at least one of the input and output of the first electronic device, stores the information in the function unit transmitted via the network from the second electronic device, forms the function group by combining one or more function units stored and stores the information of the function group formed.

Moreover, in the electronic device controller, electronic device control method and transmitting medium described in the specification of the present invention, communication is conducted with an electronic device via a network, a command including the designated information is generated to simultaneously designate a plurality of electronic devices and the command generated is output to the network. For example, communication with an electronic device as the AV apparatus is conducted via the 1394-network, a command including the designated information is generated to simultaneously designate a plurality of electronic devices and the command generated is output to the network.

Moreover, in the electronic device, electronic device control method and transmission medium, communication is conducted with the electronic device controller via the network, a designation information, on the occasion of receiving a command including the designation information for simultaneously designating a plurality of electronic devices, is extracted from the command, it is judged whether the device itself is designated or not depending on the extracted designation information and the process for the command is executed depending on the judging result. For example, communication is conducted with an electronic device controller as a personal computer via the 1394-network, a designation information, on the occasion of receiving a command including the designation information simultaneously designating a plurality of electronic devices as the AV device, is extracted from the command, it is judged whether the device itself is designated by the extracted designation information or not, and when designated, the process corresponding to the command is executed depending on the judging result.

Moreover, in the electronic device controller, electronic device control method and transmission medium described in the specification of the present invention, the first electronic device makes communication with the second electronic device via the network, generates a command including a designation information for simultaneously designating a plurality of the second electronic device and then outputs the generated command to the network, while the second electronic device makes communication with the first electronic device via the network, extracts the designation information, upon reception of the command including the designation information for simultaneously designating a plurality of second electronic device from the first electronic device from the command, judges whether the device itself is designated or not from the extracted designation information and executes the process corresponding to the command depending on the judging result. For example, the first electronic device as a personal computer makes a communication with the second electronic device as an AV device, generates the command including the designation information for simultaneously designating a plurality of second electronic device, outputs the generated command to the network, while the second electronic device makes communication with the first electronic device via the network, extracts the designation information upon reception of the command including the designation information for simultaneously designating a plurality of second electronic device from the first electronic device, judges whether the device itself is designated or not depending on the designation information extracted and executes the process corresponding to the command when designation of the device itself is judged.

According to the electronic device controller, electronic device control method and transmission medium described in the specification of the present invention, it is now possible to consider the entire part of the function group as an processing object because communication is made with a electronic device via the network, transmission of information in the function unit providing at least any one of the input and output of the electronic device is requested to the electronic device, information in the function unit transmitted from the electronic device via the network is stored, a function group is formed by combining one or more function units stored and the formed function group information is stored.

In the electronic device controller, electronic device control method and transmission medium described in the specification of the present invention, it is now possible to execute the process by receiving the information transmitted in the function group unit because communication with the electronic device controller is made via the network, information in the function unit providing at least one of the input and output of the device itself is stored, information in the function unit is transmitted to the electronic device controller when transmission of the information in the function unit is requested from electronic device controller and the information of function group is stored when information of the function group to which the device itself belongs is received from the electronic device controller.

Moreover, in the electronic device controller, electronic device control method and transmission medium described in the specification of the present invention, the first electronic device makes communication with the second electronic device via the network, requests transmission of information in the function unit providing at least one of input and output of the first electronic device to the second electronic device, stores information in the function unit transmitted from the second electronic device via the network, forms a function group by combining one or more function units stored and stores information of the function group formed, while the second electronic device makes communication with the first electronic device via the network, stores information in the function unit providing at least one of the input and output of the device itself, transmits information in the function unit to the first electronic device when request of transmission of the information in the function unit is received from the first electronic device and stores information of the function group when the information in the function group to which the device belongs is received from the first electronic device. Therefore, it is possible to control the second electronic device in the unit of function group with the first electronic device controller.

Moreover, in the electronic device controller, electronic device control method and transmission medium described in the specification of the present invention, it is possible to execute the processes in parallel by transmitting once the command to a plurality of electronic devices because communication with electronic device can be executed via the network, a command including the designation information for simultaneously designating a plurality of electronic devices is generated and the generated command is output to the network.

Moreover, in the electronic device, electronic control method and transmission medium described in the specification of the present invention, it is possible to execute the command synchronously with the other electronic device depending on the designation information because communication with the electronic device controller is made via the network, a designation information is extracted when the command including the designation information for simultaneously designating a plurality of electronic devices is received from the electronic device controller, whether the device itself is designated or not is judged depending on the extracted designation information and the process corresponding to the command is executed depending on the judging result.

In the electronic device controller, electronic device control method and transmission medium described in the specification of the present invention, it is possible to execute in parallel the same process in the first electronic device to a plurality of second electronic devices by transmitting once the command because the first electronic device makes communication with the second electronic device via the network, generates the command including the designation information for simultaneously designating a plurality of second electronic devices, outputs the generated command to the network, while the second electronic device makes communication with the first electronic device via the network, extracts the designation information when the command including the designation information for simultaneously designating a plurality of second electronic devices is received from the first electronic device, judges whether the device itself is designated or not depending on the extracted designation information and executes the process corresponding to the command depending in the judging result.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 10 is a diagram for explaining information in the function unit of a CD player module 2 shown in FIG. 1;

FIG. 11 is a diagram for explaining information in the function unit of a MD player module 3 shown in FIG. 1;

FIG. 12 is a diagram for explaining information in the function unit of a DAT player module 5 shown in FIG. 1;

FIG. 22 is a diagram showing a device ID and a group ID of each AV device when a new device group is registered;

DETAILED DESCRIPTION OF THE PREFERRED EMBODIMENTS

Figure 1:
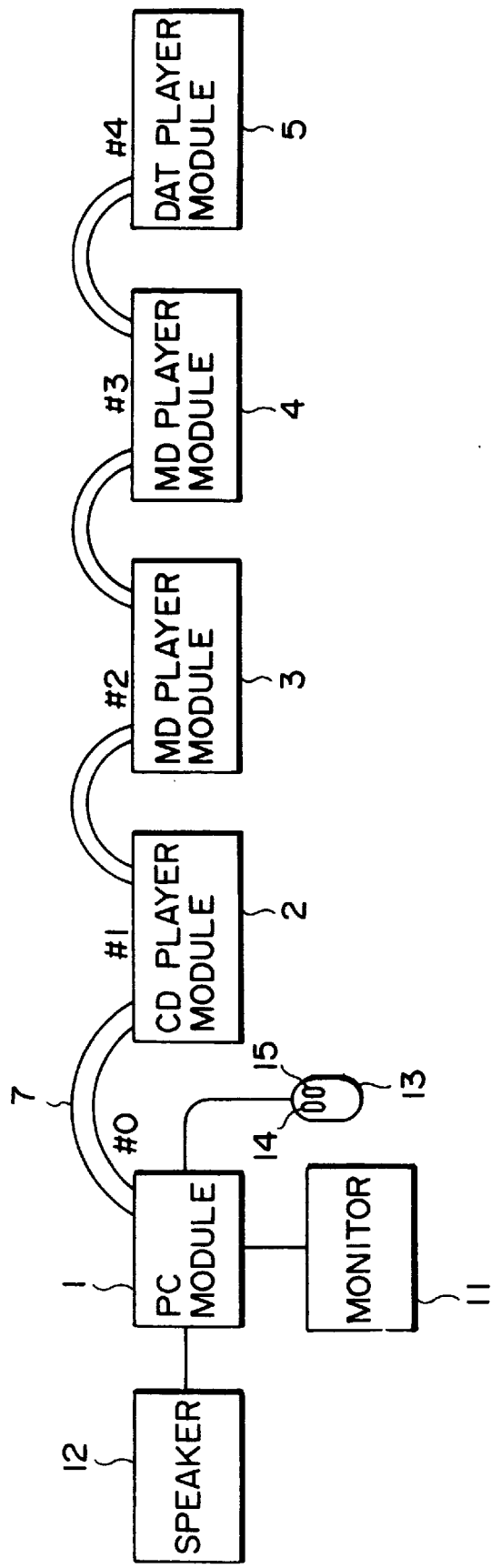
FIG. 1 is a diagram showing a structure example of an AV system to which the present invention is applied.

FIG. 1 shows a structure example of an AV system to which the present invention is applied. In this structure example, a PC module 1 which works as a computer is sequentially connected to a CD (Compact Disc) player module 2, an MD (Mini Disc: Trade Mark) player modules 3, 4 and a DAT (Digital Audio Tape) player module 5 with an IEEE (Institute of Electrical and Electronics Engineers) 1394-cable (hereinafter referred to as only 1394-cable). Moreover, a monitor 11 is designed to display the predetermined image to be output from the PC module 1. A speaker 12 converts an audio signal output from the PC module 1 into sound as an output. Moreover, a mouse (pointing device) 13 (selecting means) is manipulated for inputting the positional information to the PC module 1 and its left button 14 and right button 15 are also manipulated for adding the predetermined information to the input positional information.

Figure 2:
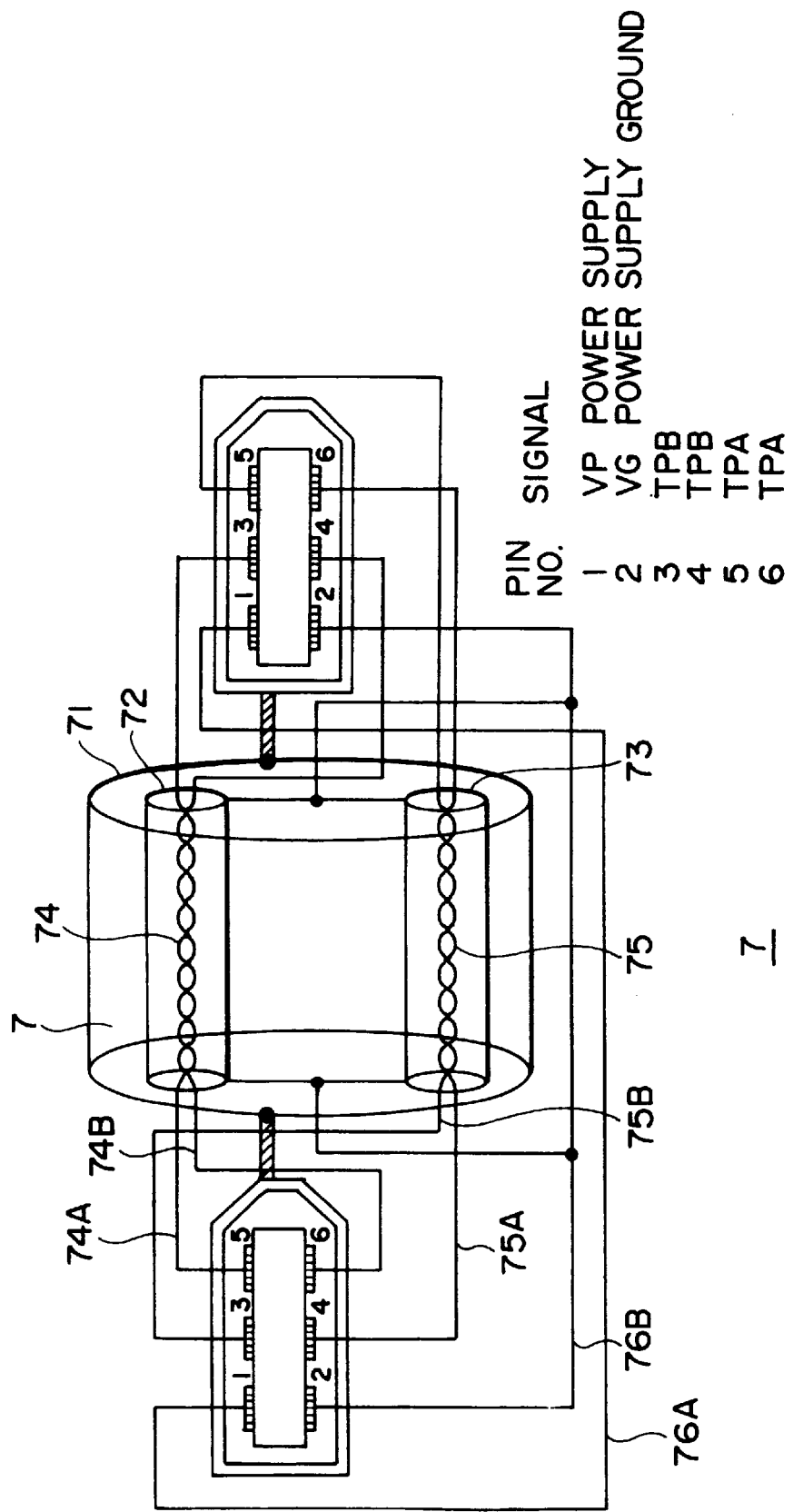
FIG. 2 is a diagram showing a structure example of a 1394-cable 7 shown in FIG. 1.

FIG. 2 shows a detail structure of the 1394-cable. As shown in this figure, the 1394-cable 7 has an external cylinder section 71 and also has the internal cylinder sections 72, 73 therein. Within the internal cylinder section 72, a twisted wire 74 consisting of the line 74A and the line 74B is arranged and within the internal cylinder section 73, a twisted wire 75 consisting of the line 75A and the line 75B. The twisted wire 74 and twisted wire 75 are respectively forming the independent signal path. Moreover, at the outside of the external cylinder section 71, the line 76A and line 76B are arranged for the supply of electrical power.

As explained, the PC module 1 is capable of transmitting and receiving a control signal and an audio signal to and from the CD player module 2, MD player modules 3, and 4, and DAT player module 5 as the AV devices having the function corresponding to the 1394 specifications via the cable 7.

Figure 3:
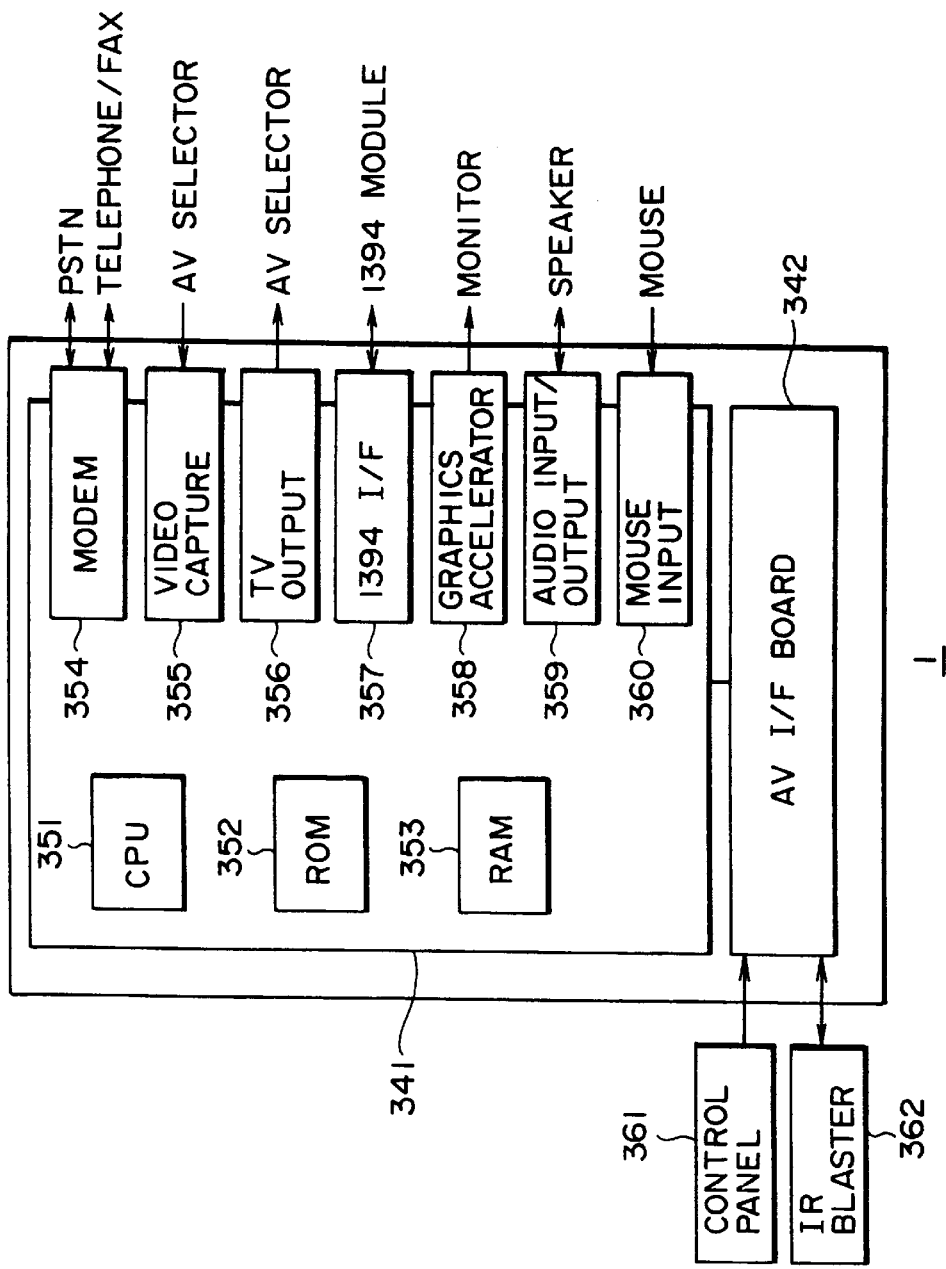
FIG. 3 is a block diagram showing a structure example of a PC module 1 shown in FIG. 1.

FIG. 3 shows a structure example of the inside of the PC module 1. This PC module 1 is composed of a mother board 341 and an AV interface (I/F) board 342. The mother board 341 is provided with various kinds of parts to realize the function as a personal computer. Namely, this PC module 1 also comprises CPU 351 (requesting means, forming means and producing means) for executing various processes, ROM 352 for storing programs which are required by CPU 351 to execute various processes, and RAM 353 (first memory means, second memory means) for adequately storing the data required by CPU 351 to execute various kinds of processes.

The mother board 341 additionally comprises a modem 354 which is connected in direct with a PSTN (Public Switched Telephone Network) or with a telephone set or facsimile apparatus (not illustrated). A video capture 355 receives an input of an video signal from the AV selector module (not illustrated) and processes this video signal input. A TV output 356 outputs the video signal from the mother board 341 to the AV selector module.

The 1394-interface (I/F) 357 (communication means, first communication means, second output means) of the mother board 341 is connected to the other AV device (CD player module 2 in the case of this embodiment) via the 1394-cable 7. The 1394-interface 357 is designed to process the data transmitted and received via the 1394-cable 7. A graphic accelerator 358 (output means) produces a graphic data, outputs it to the monitor 11 for the purpose of display. Moreover, an audio input/output 359 outputs the audio signal from the mother board 341 to the speaker 12.

Moreover, a mouse input interface 360 is designed to input a positional information (positional information on the two-dimensional plane) and click information (manipulating information of the left button 14 and right button 15) input from the mouse 13.

The AV interface board 342 is connected to a control panel 361 and an IR (Infrared) blaster 362. The AV interface board 342 controls the mother board 341 corresponding to an input from the control panel 361 or IR blaster 362.

Figure 4:
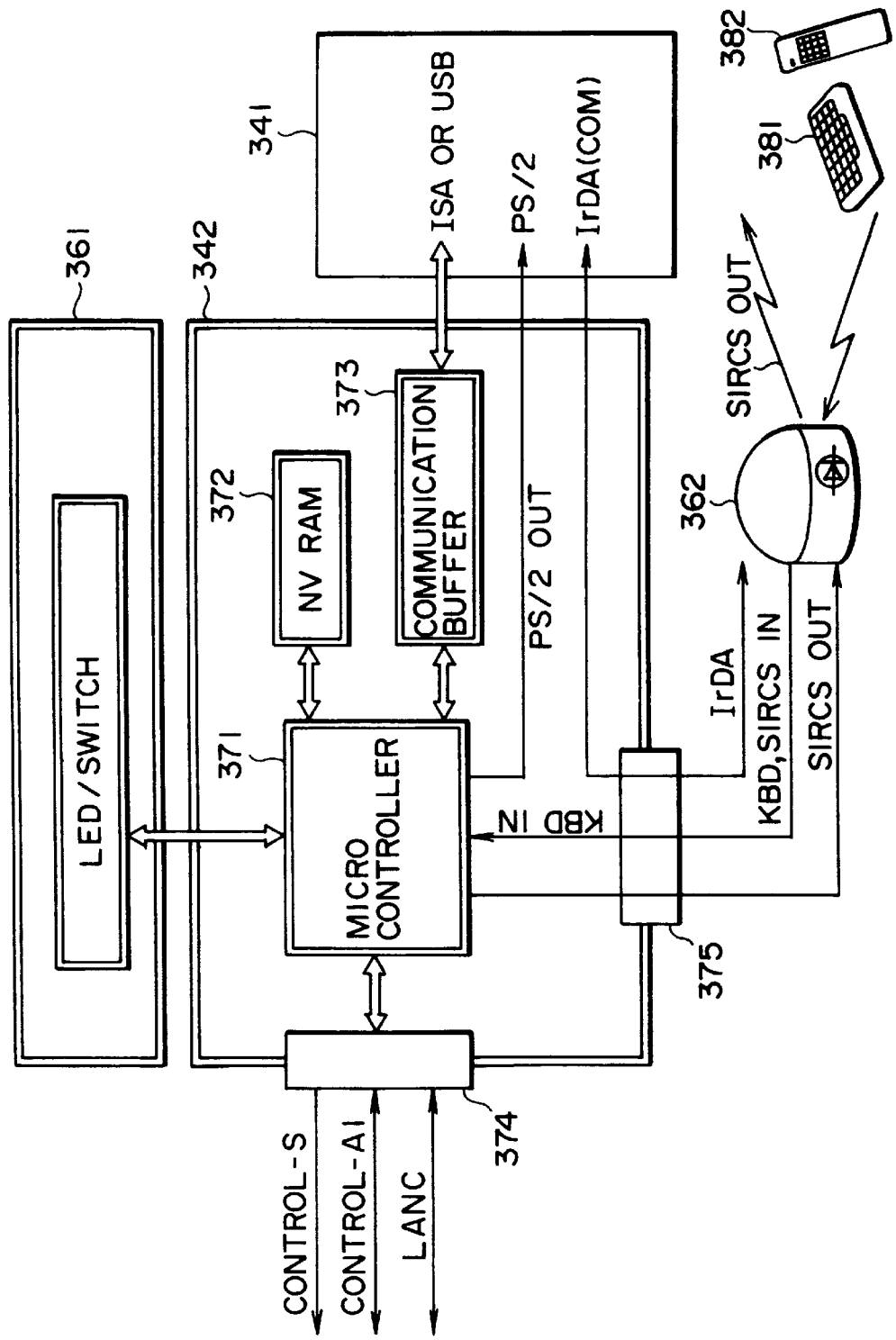
FIG. 4 is a block diagram showing a structure example of an AV interface board 342 shown in FIG. 3.

FIG. 4 shows a detail structure example of the AV interface board 342. The AV interface board 342 has a micro-controller 371 and executes various kinds of processes corresponding to an input from various kinds of switches of the control panel 361. This micro-controller 371 also controls the lighting of LED of the control panel 361. An NVRAM (Nonvolatile Random Access Memory) 372 is designed to store the data which must be stored even after the power supply of the micro-controller 371 is turned OFF. A communication buffer 373 is connected to the ISA (Industry Standard Architecture) or USB (Universal Serial Bus) as the extension slot of the mother board 341. Moreover, the micro-controller 371 is designed to output the signal based on the PS/2 (Personal System 2) standard to the mother board 341.

The IR blaster 362 receives the infrared signal output from the infrared keyboard (radio keyboard) 381 or remote commander 382 and converts this infrared signal to an electrical signal to output it as the KBD signal to the micro-controller 371. Moreover, the IR blaster 362 receives an input of the control signal based on the SIRCS (Standard Code for Infrared Remote Control System) (Trade Mark) standards from the micro-controller 371 via the terminal 375 and outputs the control signal as the infrared signal.

Moreover, the AV interface board 342 transmits or receives the signal based on the IrDa (Infrared Data Association) standards between the mother board 341 and IR blaster 362.

To the terminal 374 of the AV interface board 342, the control signal based on the control S, control A1 and LANC standards is input or output.

Figure 5:
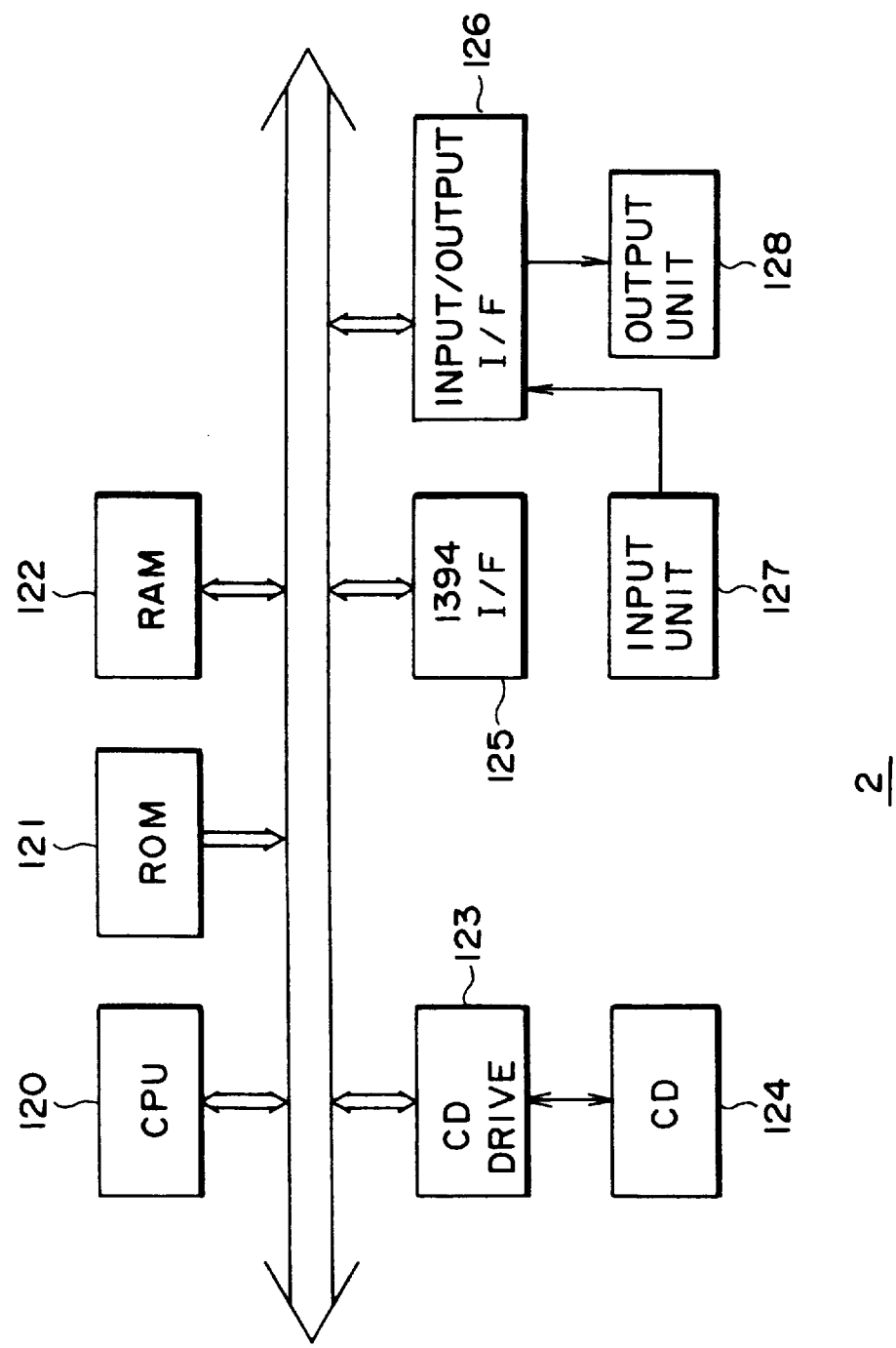
FIG. 5 is a block diagram showing a structure example of a CD player module 2 shown in FIG. 1.

FIG. 5 shows a structure example of the inside of the CD player module 2. CPU 120 (extracting means, comparing means, executing means, judging means and processing means) is designed to execute various kinds of processes depending on the programs stored in the ROM 121 (first memory means, third memory means). RAM 122 (second memory means, fourth memory means) stores as required by CPU 120 to store the data which is necessary for execution of various processes. CD drive 123 reads the data stored in the CD 124 and outputs this data to the 1394-cable via the 1394-interface 125 (communication means, transmitting means, output means and second communication means). Or, this data is output to the output section 128 via the input/output interface 126. The input section 127 is manipulated for inputting various commands and the input commands are supplied to the CPU 120 via the input/output interface 126.

Figure 6:
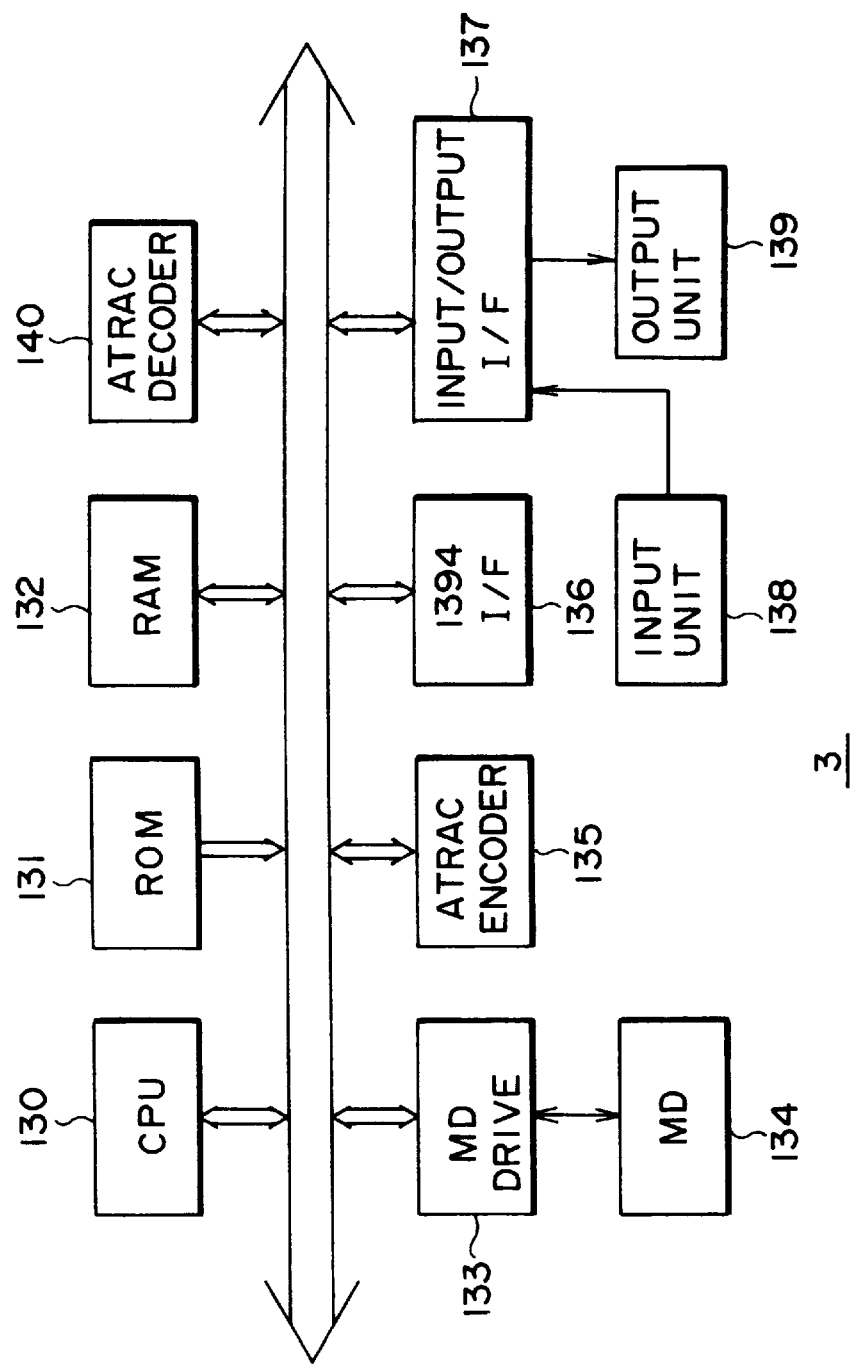
FIG. 6 is a block diagram showing a structure example of a MD player module 3 shown in FIG. 1.

FIG. 6 shows a structure example of the inside of the MD player module 3. CPU 130 (extracting means, comparing means, executing means, judging means, processing means) executes various kinds of processes depending on the programs stored in ROM 131 (first memory means, third memory means) RAM 132 (second memory means, fourth memory means) stores the data required by CPU 130 to execute various kinds of processes. MD drive 133 drives the MD 134 to write data thereto and read data therefrom. ATRAC (Adaptive Transform Acoustic Coding) encoder 135 compresses data depending on ATRAC to supply the data to the MD drive 133. Moreover, ATRAC decoder 140 expands the data output from the MD drive 133 depending on ATRAC. The data expanded by the ATRAC decoder 140 is output to the 1394-cable 7 via the 1394-interface 136 (communication means, second communication means, transmitting means, output means) or is output to the output section 139 via the input/output interface 137. The input section 138 is manipulated for inputting various kinds of command and the input command is then input to the CPU 130 via the input/output interface 137.

Here, the MD player module 4 is also structured like the MD player module 3. Therefore, the explanation thereof is omitted.

Figure 7:
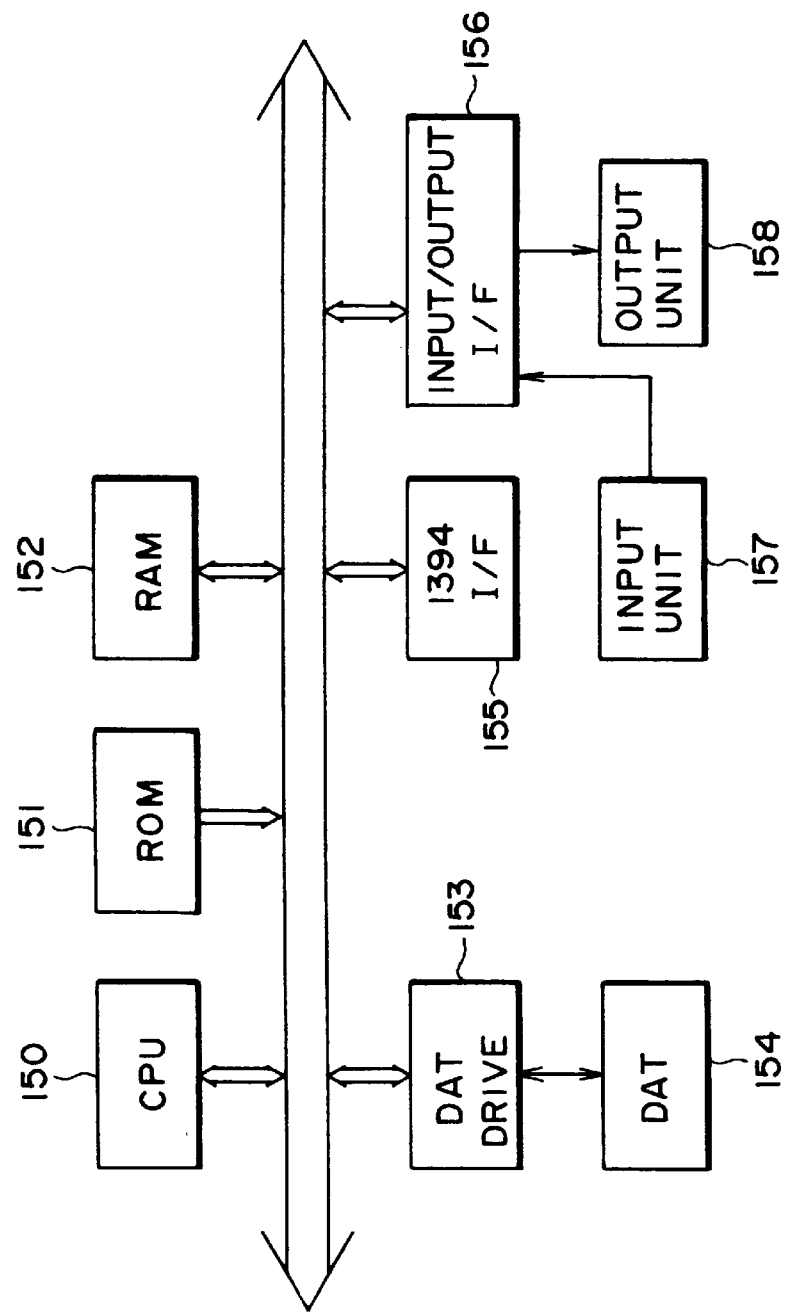
FIG. 7 is a block diagram showing a structure example of a DAT player module 5 shown in FIG. 1.

FIG. 7 shows a structure example of the internal side of the DAT player module 5. In this structure example, CPU 150 (extracting means, comparing means, executing means, judging means, processing means) executes various kinds of processes depending on the programs stored in ROM 151 (first memory means, third memory means). RAM 152 (second memory means, fourth memory means) stores the data required by CPU 150 to execute various kinds of processes. DAT drive 153 drives DAT 154 to write data and to read data recorded therein. The data read by the DAT drive 153 is output to the 1394-cable via the 1394-interface 155 (communication means, second communication means, transmitting means, output means) or output to the output section 158 via the input/output interface 156. The input section 157 is manipulated for inputting various kinds of commands and the input command is then input to CPU 150 via the input/output interface 156.

Figure 8:
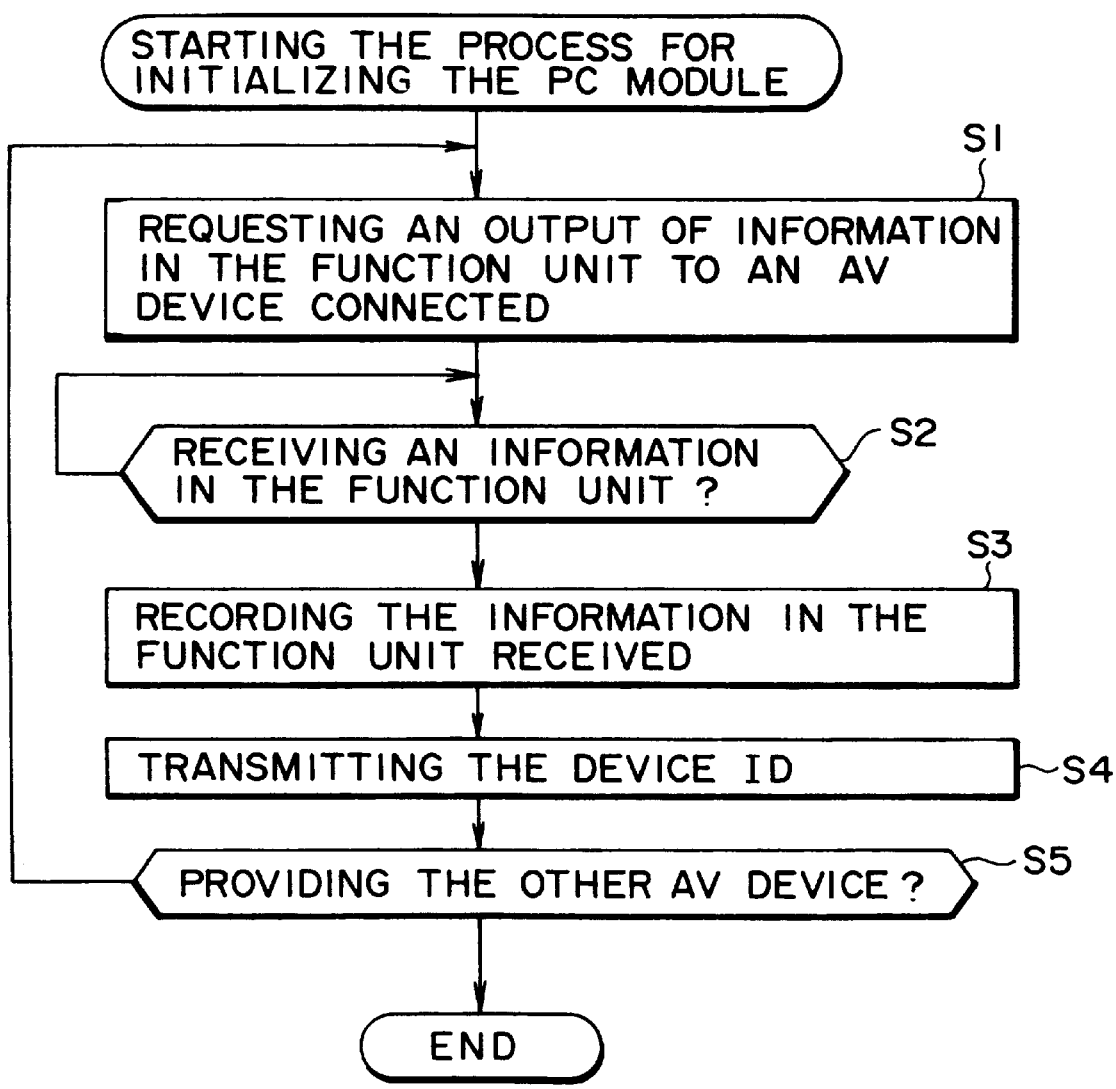
FIG. 8 is a flowchart for explaining the process for initializing a PC module 1 shown in FIG. 1.

Next, the process to be executed when the power supply of the PC module 1 is turned ON (initializing operation is executed) will be explained with reference to the flowchart of FIG. 8. First, in the step S1, CPU 351 of the PC module 1 requests output of information in the function unit to any one of the AV devices (in the embodiment of FIG. 1, CD player module 2, MD player module 3, 4 and DAT player module 5) connected to the 1394-cable 7. Upon reception of this request (see step S6 in FIG. 9), each AV device reads the information in the function unit from ROM as will be described with reference to FIG. 9 and transmits the data to the PC module 1 via the 1394-cable 7 (see step S7 in FIG. 9). The information in the function unit transmitted in this case will be explained later with reference to FIG. 10 to FIG. 12.

CPU 351 of the PC module 1 is in the waiting mode, in the step S2, until the information in the function unit is transmitted from the predetermined AV device. When the information in the function unit is transmitted, this information is received by the 1394-interface 357. Upon reception of the information in the function unit via the 1394-interface 357, CPU 351 stores the data to RAM 353 in the step S3 and thereafter CPU 351 transmits the device ID to the AV device in the step S4. Namely, CPU 351 reads the device ID corresponding to the node number of the AV device in the communicating condition from RAM and outputs this device ID to the interface 357.

In the subsequent step S5, CPU 351 judges whether the AV device which does not receive the supply of the information in the function unit is still left or not. When such AV device is still left, similar process is executed in the step S1.

As explained above, the PC module 1 receives supply of the information in the function unit of each AV device from all AV devices connected to the 1394-cable 7 and also outputs the device ID corresponding to respective AV devices. In the step S5, the initializing process is completed when it is judged that supply of the information in the function unit from all AV devices is received.

Next, operations at the time of initialization of each AV device will be explained with reference to the flowchart of FIG. 9. First, in the step S6, CPU 120 of the CD player module 2, for example, receives the request output by the PC module 1 in the step via the 1394-interface 125. Upon reception of this request, CPU 120 reads, in the step S7, the information in the function unit stored in ROM 121 and outputs this information to the PC module 1 via the 1394-interface 125 and 1394-cable 7. As explained above, CPU 351 of the PC module 1 receives this information in the function unit in the step S2 and stores it to RAM 353 in the step S3.

In the subsequent step S8, CPU 120 receives the device ID transmitted in the step S4 and records it to RAM 122.

Since the above examples are the initializing processes to be executed when the device group explained later is not registered, the explanation about the process for transmitting the group ID corresponding to the device group by the PC module 1 and the process for receiving and storing the transmitted group ID by each AV device is omitted here.

Figure 9:
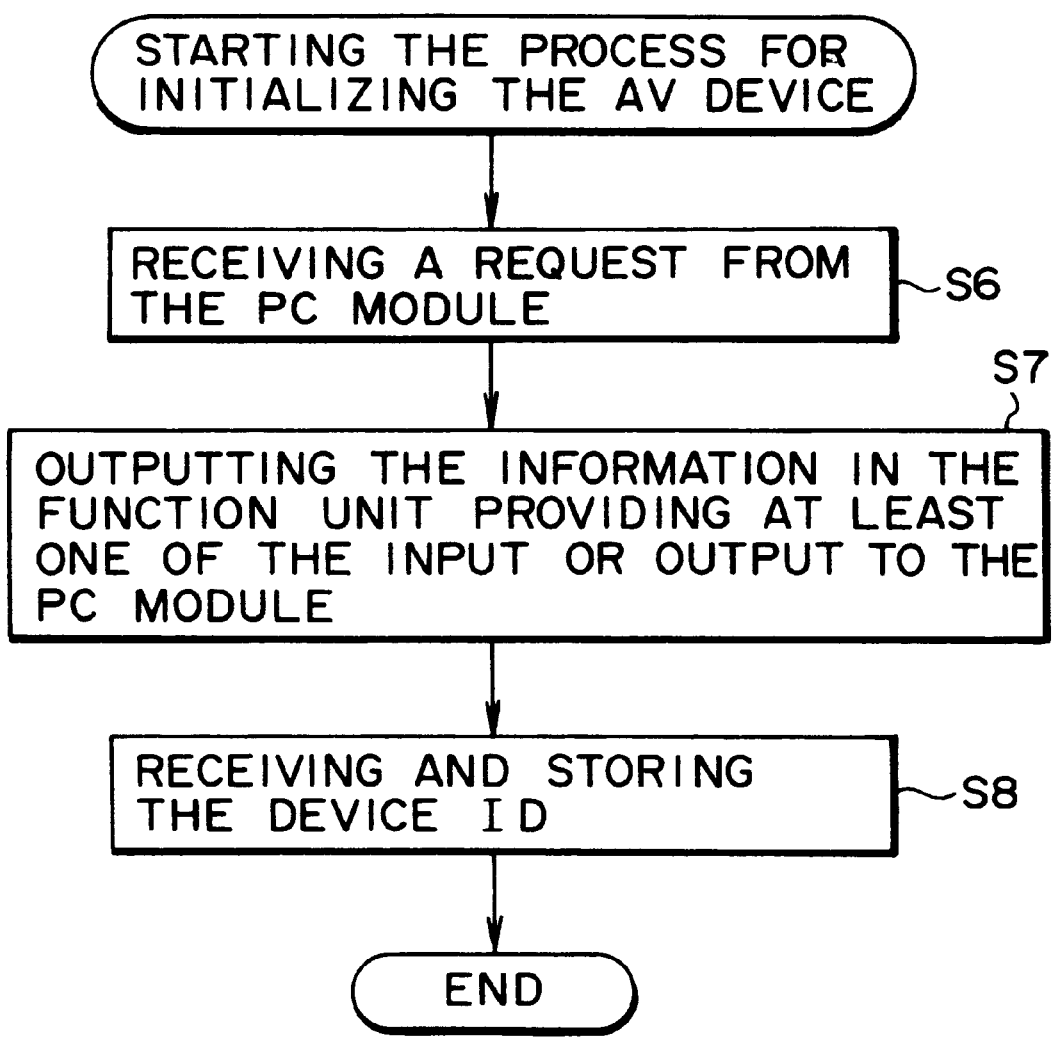
FIG. 9 is a flowchart for explaining the process for initializing the AV devices shown in FIG. 1.

FIG. 10 shows an example of the information in the function unit output from the CD player module 2 by the process of FIG. 9. Here, the information in the function unit means the information regarding an input/output format in the function unit providing at least one of input and output and the CD drive 123 is provided as such function unit in the case of the CD player module 2.

As shown in FIG. 10, the input format of the CD drive 123 is defined as the PCM (Pulse Code Modulation) data. Moreover, the output format is also defined as the PCM data.

The MD drive modules 3, 4 have the MD drive 133, ATRAC encoder 135, ATRAC decoder 140 as the function units. The input/output format of the MD drive 133 is formed of digital data as shown in FIG. 11. Moreover, the input format of the ATRAC encoder 135 is defined as the PCM data, while the output format thereof is defined as the ATRAC data. The input format of the ATRAC decoder 140 is defined as the ATRAC data, while the output format thereof as the PCM data.

FIG. 12 indicates the information in the function unit stored in ROM 151 of the DAT player module 5. As shown in this figure, the input/output formats of the DAT drive 153 of the DAT player module 5 are defined as the PCM data.

With the initializing operation explained above, the information in the function unit shown in FIG. 10 to FIG. 12 is transmitted to the PC module 1 and is then stored in RAM 353. When a user instructs display of the AV device selection menu by manipulating the predetermined key of the IR keyboard 381, the IR signal corresponding to the manipulated key is output to the IR blaster 362. The IR blaster 362 converts this IR signal to an electrical signal to output to the micro-controller 371. The micro-controller 371 outputs the signal corresponding to the input signal to CPU 351 of the PC module 1.

When a user inputs the key selection menu display command, CPU 351 executes the device selection menu display process. Namely, as explained above, the information in the function unit which is supplied to the PC module 1 from each AV device and stored in RAM 353 during the initializing operation is read by CPU 351 of the PC module 1 and is then supplied to the graphic accelerator 358. The graphic accelerator 358 produces a graphical user interface (GUI) image corresponding to the supplied information in the function unit and displays the produced GUI image on a monitor 11.

As explained above, the monitor 11 displays, as shown in FIG. 13A, for example, the icon FIGS. 1A to 5A corresponding to the AV devices connected to the 1394-cable 7. This icon figure is also given a figure making each device to recognize that any of input and output is possible. For example, it is indicated by the direction of a triangle that the icon 4A of the CD player module 2 enables only output disabling input. On the other hand, it is also indicated by the direction of two triangles that the icon 1A of the PC module 1, icons 2A, 3A of the MD player modules 3, 4 and icon 5A of the DAT player module 5 enable both input and output.

Next, in the display image shown in FIG. 13A, the process executed when a user produces a new device group will be explained.

Figure 13A:
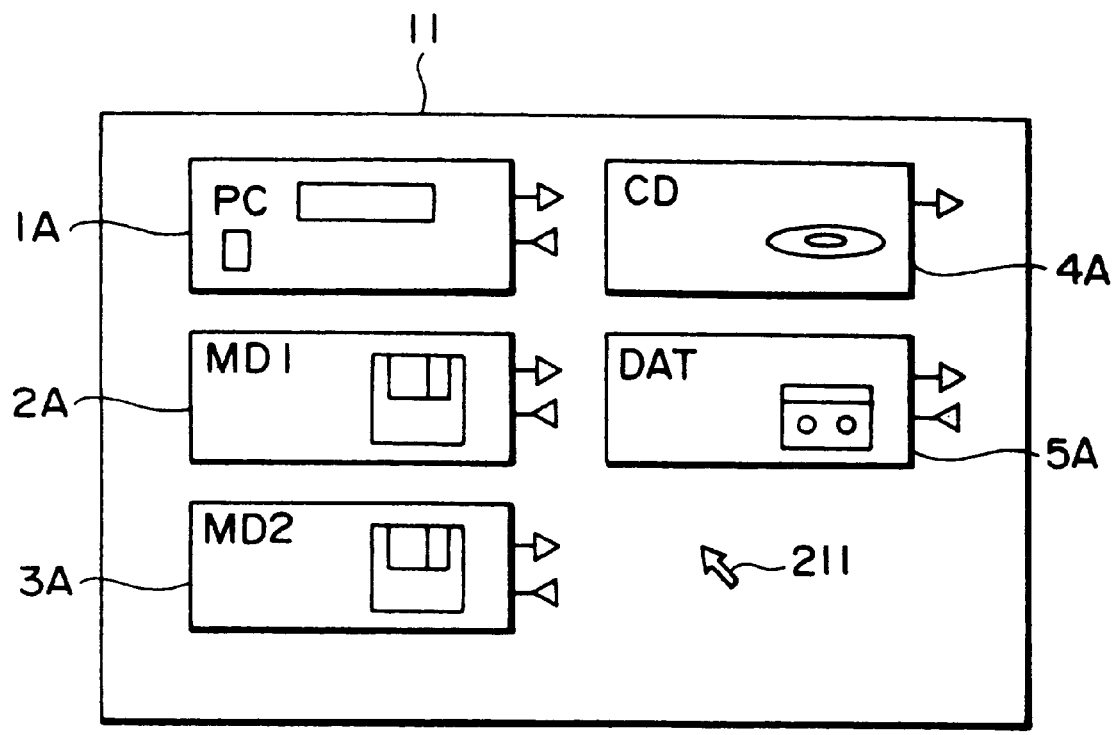
FIGS. 13A and 13B show a display example of the display image displayed after the initializing process is executed.
Figure 13B:
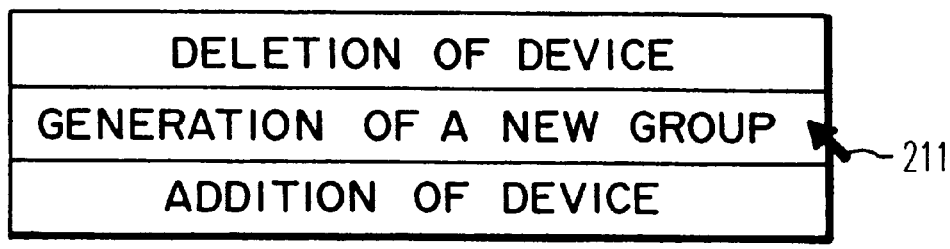
Figure 14:
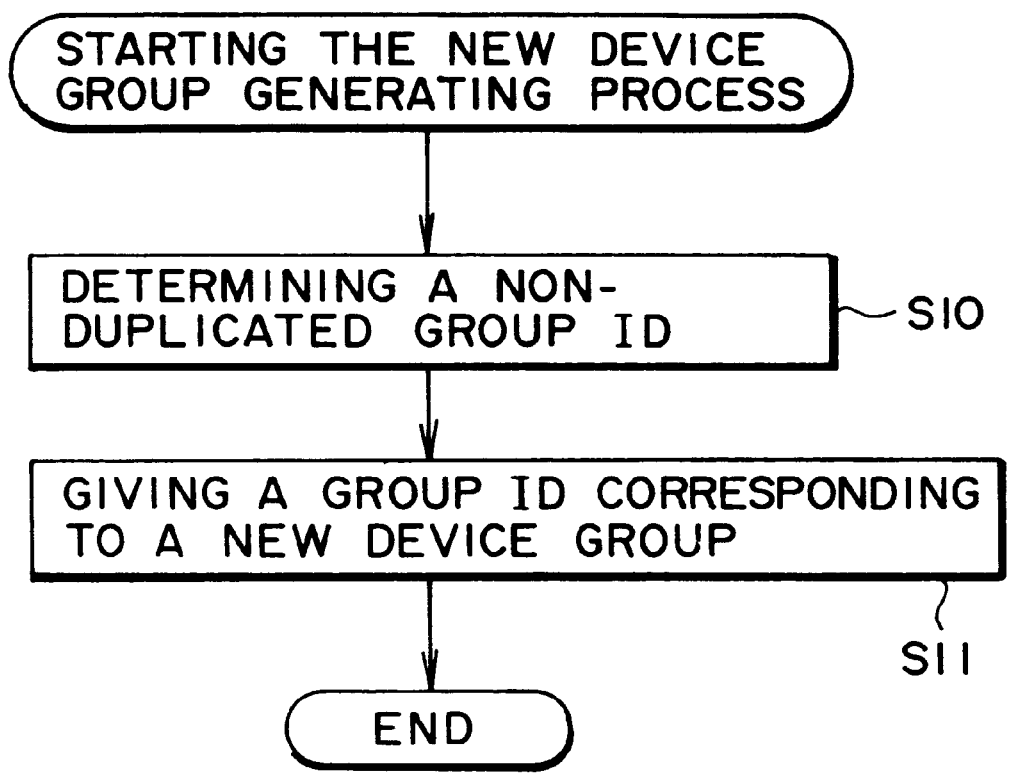
FIG. 14 is a flowchart for explaining an example of the process to be executed when the process to form a new device group is executed in the display image of FIG. 13.

In the display image as shown in FIG. 13A, when a user clicks (depresses) once the right button 15 of the mouse 13, a window shown in FIG. 13B is displayed. In this window, three kinds of processing items, namely "Deletion of device", "Generation of a new group" and "Addition of device" are displayed. When a user designates the second display item "Generation of a new group" with the pointer 211 by manipulating the mouse 13 and then clicks once the left button 14, the process shown in FIG. 14 is executed.

When this process is executed, CPU 351 of the PC module 1 retrieves the group ID already used from RAM 353 in the step S10 and determines the non-overlapped group ID.

Figure 15:
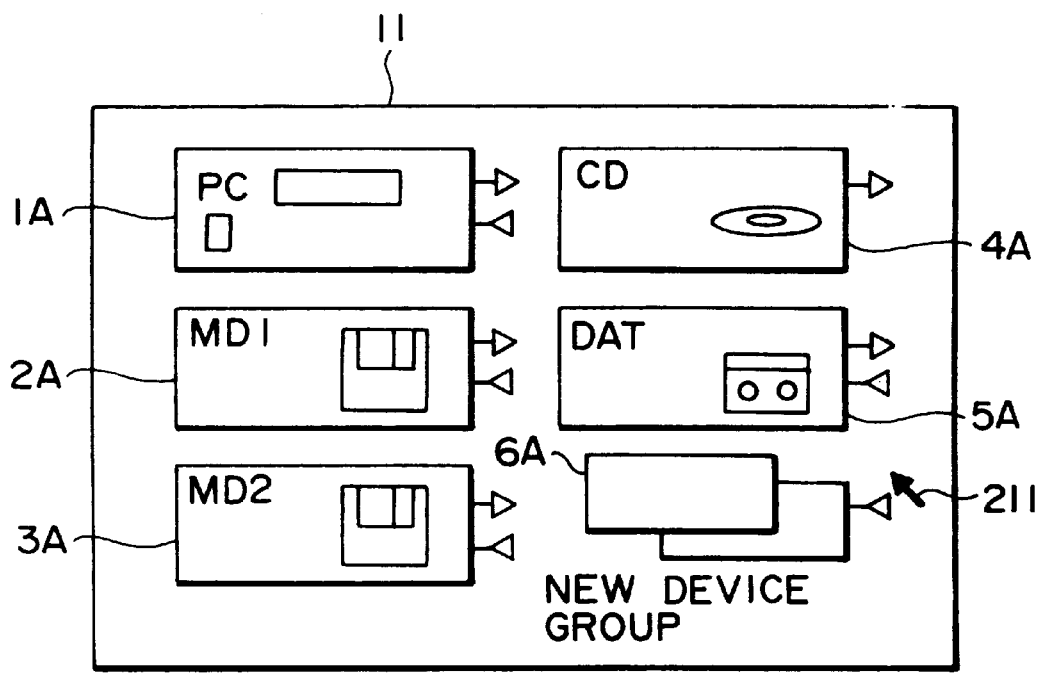
FIG. 15 is a diagram showing an example of the display image after the process shown in FIG. 14 is executed.
Figure 17:
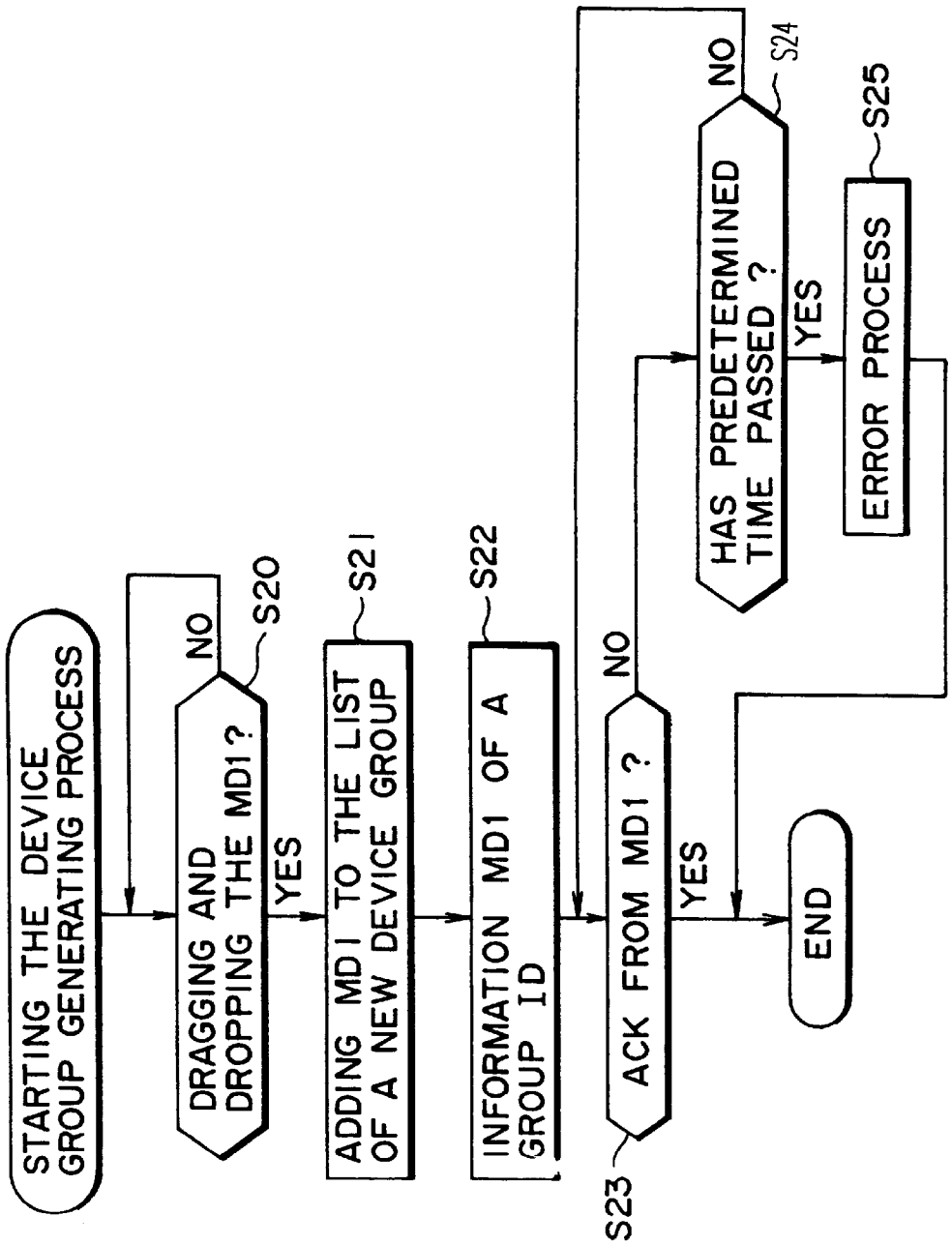
FIG. 17 is a flowchart showing an example of the process executed when an MD player module 3 is registered for a new device group in the PC module 1.

In the subsequent step S11, CPU 351 executes the process for enabling correspondence of the new device group to the AV device. Namely, when this process is executed, as shown in FIG. 15, the icon 6A indicating a new device group is displayed on the screen of the monitor 11. Here, the process shown in FIG. 17 is executed.

Figure 16:
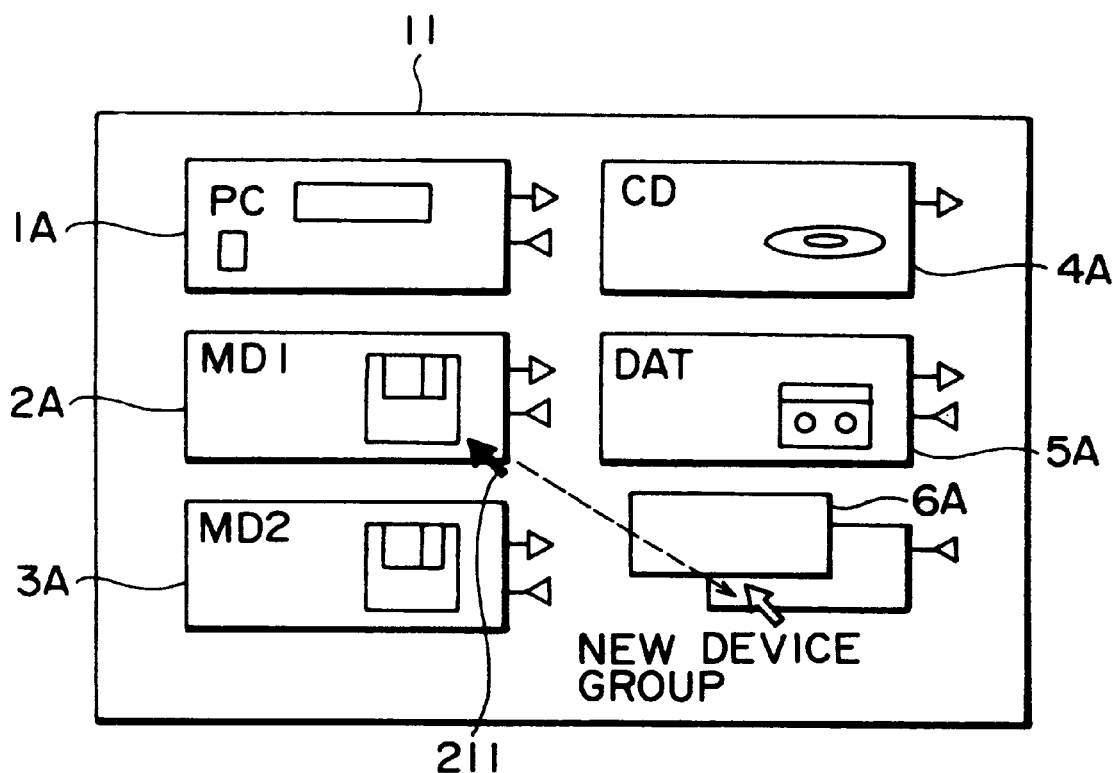
FIG. 16 is a diagram showing a display example when an MD player module 3 is registered to a new device group.

When a user manipulates the mouse 13 as shown in FIG. 16, the pointer 211 moves on the screen. Moreover, when a user depresses the left button 14 on the icon 2A indicating the MD player module 3, then moves the pointer 211 and depresses the left button 14 on the icon 6A indicating a new device (executes the drag and drop), CPU 351 judges, in the step S20 in FIG. 17, the drag and drop has been executed for the icon 2A and skips to the step S21. When CPU 351 judges the drag and drop is not executed for the icon 2A (NO), the process similar to that explained above is repeated in the step S20.

In the step S21, CPU 351 adds the MD player module 3 to a list of the new device group. In the step S22, the group ID determined in the step S10 of FIG. 14 is notified by transmitting the command explained later to the MD player module 3.

Figure 18:
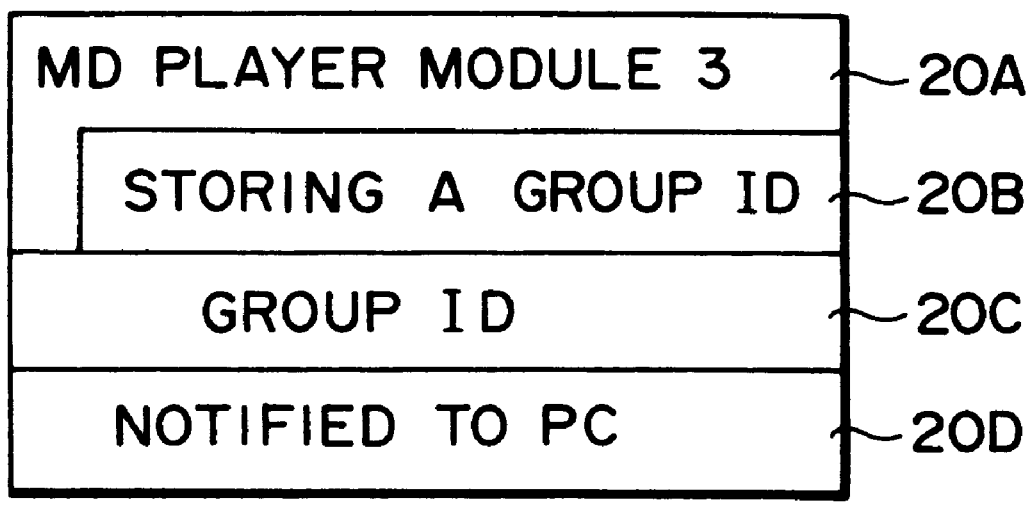
FIG. 18 is a diagram showing an example of a command transmitted from the PC module 1 when the process of FIG. 17 is executed.

FIG. 18 shows an example of a command to be transmitted to the MD player module 3 from the PC module 1. In this example, the data designating the MD player module 3 is stored in the destination field 20A indicating the destination of command transmitted from the PC module 1. Moreover, in the field 20B in which the command is stored, the command for instructing storing of the group ID is stored. Moreover, the group ID to be stored is stored in the field 20C in which the data is stored. In the final field 20D, the data indicating necessity of notification to the PC module 1 when the process is completed is stored.

The MD player module 3 receives the data shown in FIG. 18 via the 1394-interface 136, judges this command is directed to own device or not with reference to the data stored in the destination field 20A and extracts, when the command is directed to own device, the command from the field 20B and then executes this command. As a result, the MD player module 3 stores the group ID stored in the data field 20C to RAM 132 as will be explained later, and returns the ACK (Acknowledge) signal indicating that the group ID has been received.

In the step S23, CPU 351 judges whether the ACK signal has been received from the AV device or not. When it is judged that the ACK signal is received (YES) as a result, the process is completed (End). When it is judged that the ACK signal is not yet received (NO), the process skips to the step S24.

In the step S24, CPU 351 judges whether the predetermined time has passed or not. As a result, when the predetermined time has not passed (NO), the similar process is repeated in the step S23. When the predetermined time has passed (YES), the process skips to the step S25.

In the step S25, CPU 351 displays the message indicating that a time-out error is generated in the monitor 11 and then completes the process (End).

Next, the process to be executed by the MD player module 3 when the above processes are executed will be explained.

Figure 19:
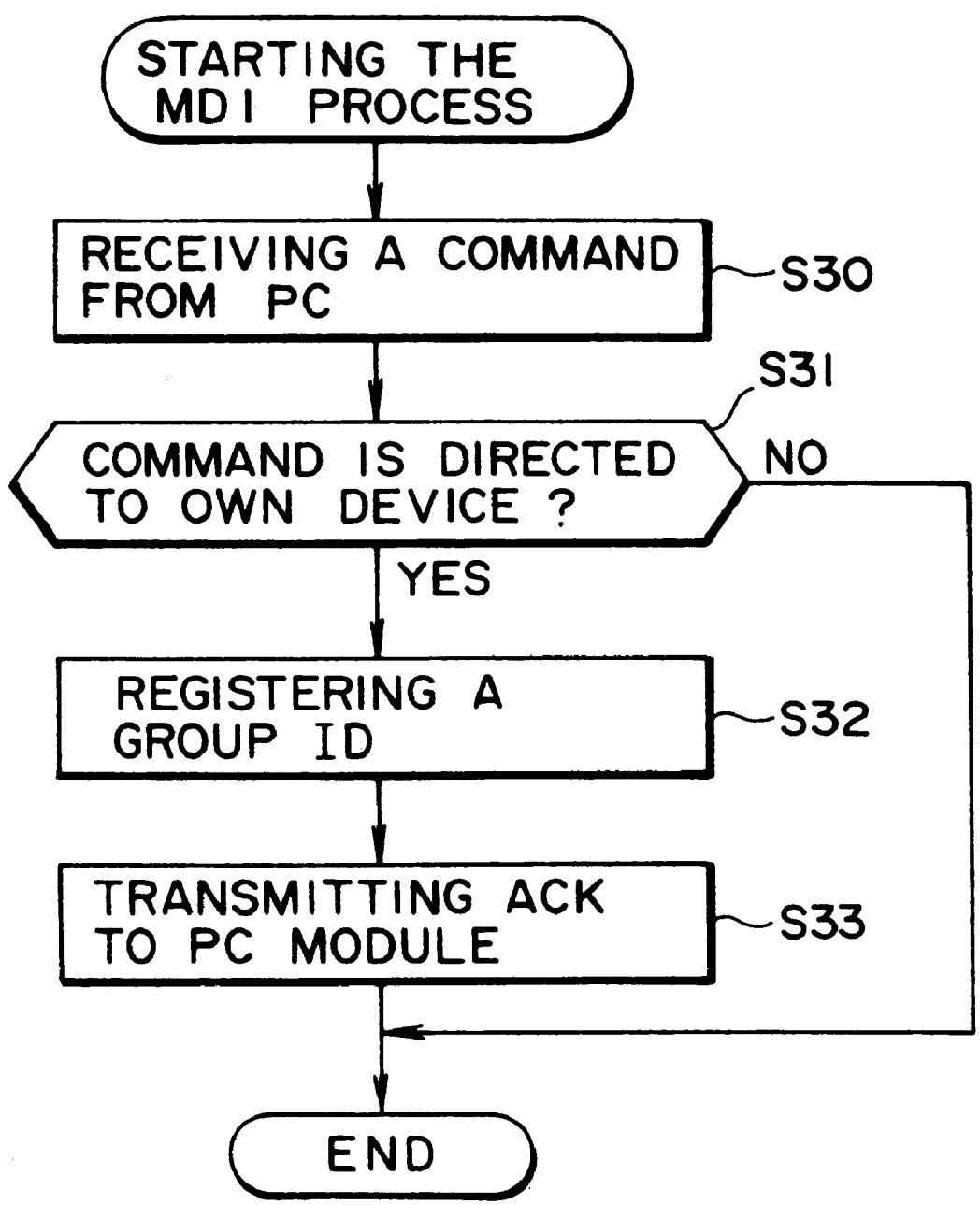
FIG. 19 is a flowchart for explaining an example of the process executed in the MD player module 3 when the process of FIG. 17 is executed.

FIG. 19 is a flowchart for explaining an example of the process to be executed by the MD player module 3 while the process of FIG. 17 is being executed by the PC module 1. When this process is executed, CPU 130 receives, in the step S30, the command transmitted from the PC module 1 (refer to FIG. 18). Next, in the step S31, CPU 130 reads the data stored in the destination field 20A to judge the command obtained is directed to own device or not. When the command is judged to be not directed to own device (NO), the process is completed (End). Moreover, when the command is judged to be directed to own device (YES), the process proceeds to the step S32.

In the step S32, CPU 130 extracts the command from the command field 20B and executes this command in order to extract the group ID stored in the data field 20C and then stores it to RAM 132. As a result, the MD player module 3 recognizes its own group ID.

In the subsequent step S33, CPU 130 returns the ACK signal indicating completion of process to the PC module 1 depending on the data stored in the final field 20D. As a result, the PC module 1 completes the process by judging the ACK signal has been received in the step S23.

With the process explained above, the predetermined group ID is assigned to the MD player module 3.

Figure 20:
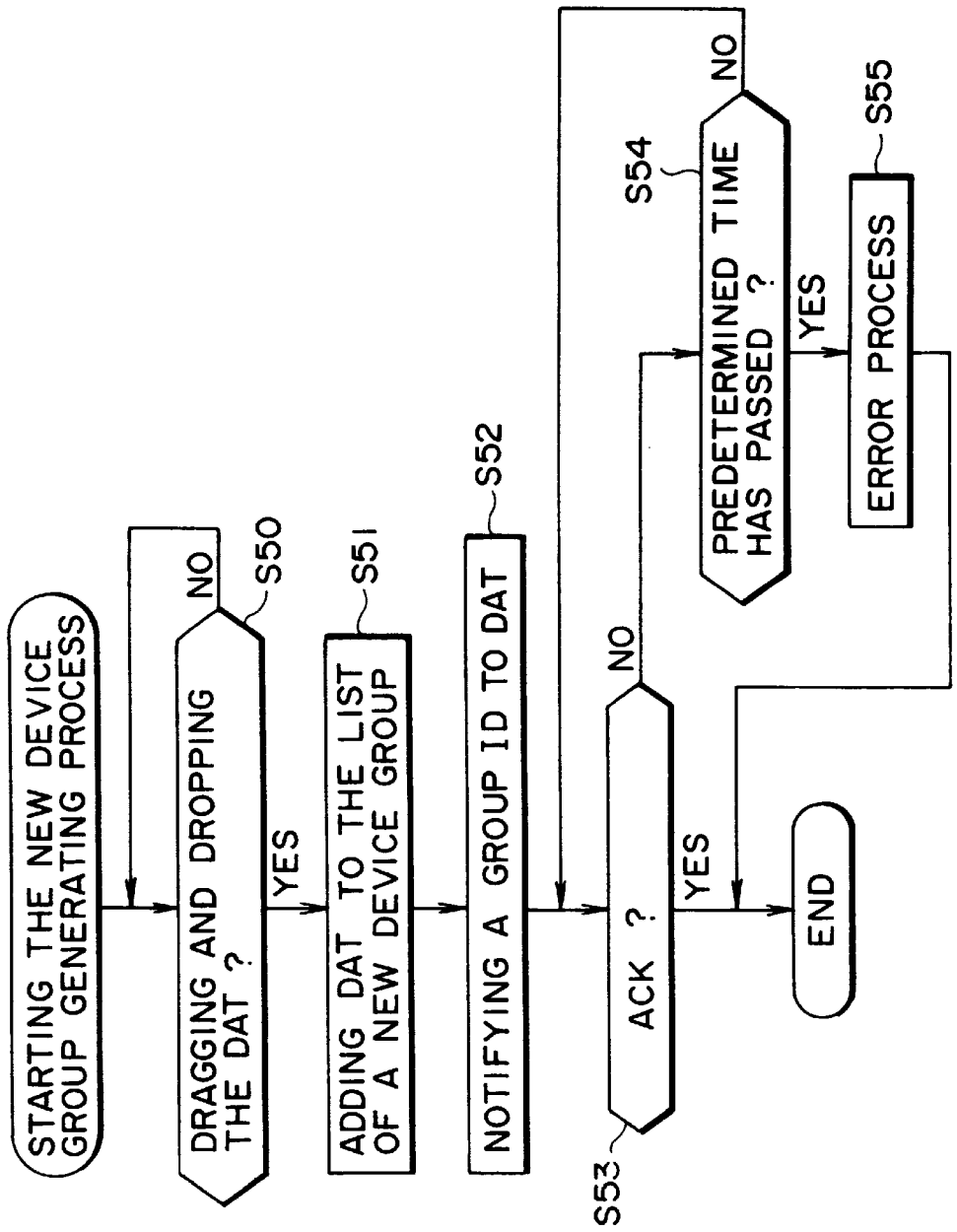
FIG. 20 is a flowchart for explaining an example of the process executed in the PC module 1 when the DAT player module 5 is registered for a new device group.

Next, in the display image shown in FIG. 16, when the icon 5A indicating the DAT player module 5 is dragged and dropped to the icon 6A indicating a new device group as explained above, the PC module 1 executes the process shown in FIG. 20.

When this process is executed, CPU 351 of the PC module 1 judges, in the step S50, whether the icon 5A indicating the DAT player module 5 is dragged and dropped. As a result, when the drag and drop is judged not executed (NO), the process similar to that explained above is repeated in the step S50. When the drag and drop is judged executed (YES), the process skips to the step S51.

In the step S51, CPU 351 adds the DAT player module 5 to the list of a new device group. In the step S52, the group ID is notified to the DAT player module 5 by transmitting the predetermined command.

In this case, the command transmitted to the DAT player module 5 is similar to that shown in FIG. 18, except for the fact that the data stored in the destination field 20A is changed by the DAT player module 5A.

The DAT player module 5 reads the data shown in FIG. 18 with the 1394-interface 155 and judges whether the command is directed to own device or not by making reference to the destination field 20A. When the data is judged to be directed to own device, DAT player module 5 extracts the command from the command field 20B and executes this command. As a result, the DAT player module 5 stores, as will be described later, the group ID stored in the data field 20C to RAM 152 and returns the ACK signal indicating the group ID is received.

In the step S53, CPU 351 judges whether the ACK signal has been received from the DAT player module 5. When it is judged that the ACK signal has been received (YES), the process is completed (End). When the ACK signal is judged not to be received (NO), the process proceeds to the step S54.

In the step S54, CPU 351 judges whether the predetermined time has passed or not. As a result, when it is judged the predetermined time has not passed (NO), operation returns to the step S53 and the process similar to that explained above is repeated. When it is judged the predetermined time has passed (YES), the process proceeds to the step S55.

In the step S55, CPU 351 displays the message indicating a time-out error is generated in the monitor 11 and then completes the process (End).

Next, the process executed by the DAT player module 5 while the process explained above is executed will be explained below.

Figure 21:
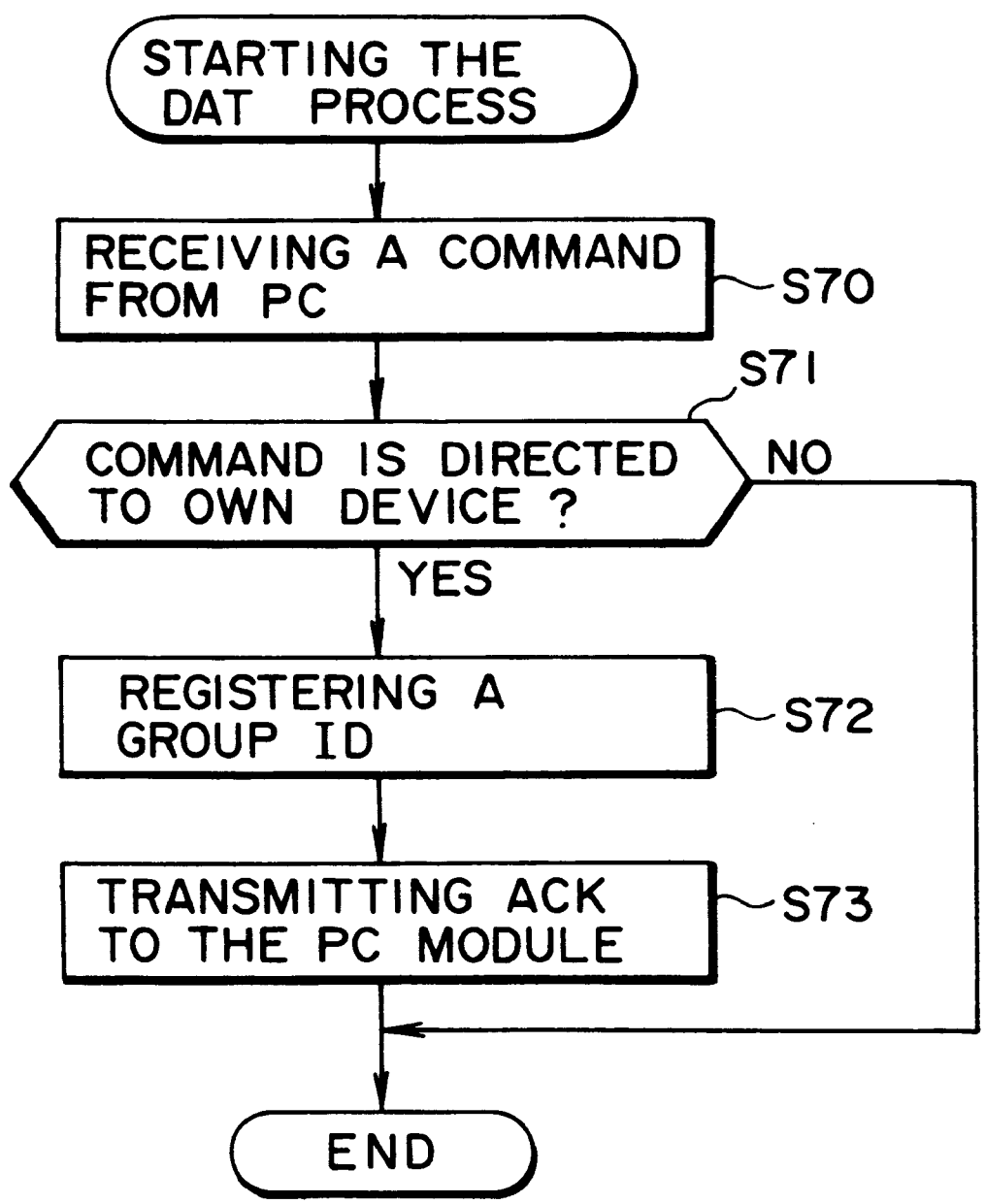
FIG. 21 is a flowchart for explaining an example of the process executed in the DAT player module 5 when the process shown in FIG. 20 is executed.

FIG. 21 is a flowchart for explaining an example of the process to be executed by the DAT player module 5 while the process of FIG. 20 is executed by the PC module 1. When this process is executed, CPU 150 receives, in the step S70, the command (refer to FIG. 18) transmitted from the PC module 1. Next, proceeding to the step S71, CPU 150 reads the data stored in the destination field 20A and judges whether the command obtained is directed to own device or not. As a result, when the command is judged not to be directed to own device (NO), the process is completed (End). When the command is judged to be directed to own device (YES), the process proceeds to the step S72.

In the step S72, CPU 150 extracts a command from the command field 20B and executes this command to extract the group ID stored in the data field 20C and then store it to RAM 152. As a result, the DAT player module 5 recognizes its own group ID.

In the subsequent step S73, CPU 150 returns, depending on the data stored in the final field 20D, the ACK signal indicating the end of process to the PC module 1.

With the process explained above, the predetermined group ID is assigned to the DAT player module 5.

FIG. 22 shows the relationship between the device ID assigned to each AV device by the process explained above and the group ID. The node ID is peculiar to the 1394-interface and is given automatically to each AV device by the 1394-interface when the power supply is turned ON. In this example, as shown in FIG. 1, the node ID=0 is assigned to the PC module 1 and such nodes 1, 2, 3, 4 are respectively assigned to the CD player module 2, MD player modules 3, 4 and DAT player module 5.

Moreover, as the device ID, 100, 101, 102, 103 and 104 are respectively assigned to the PC module 1, CD player module 2, MD player modules 3, 4 and DAT module 5. In addition, as the group ID, 200 is respectively assigned to the MD player module 3 and DAT player module 5.

Figure 23A:
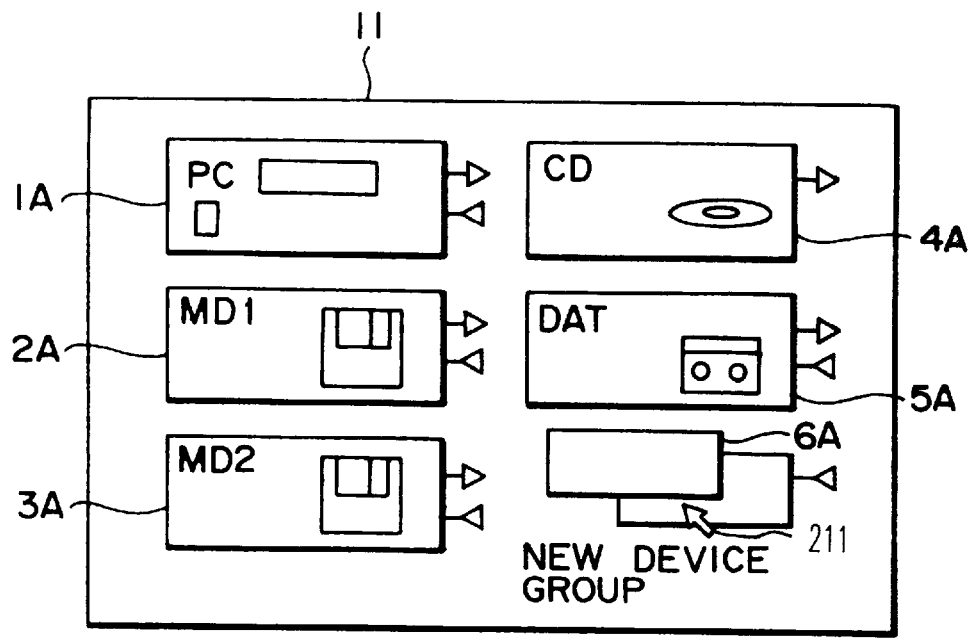
FIGS. 23A and 23B show a display example of a window displayed when an icon 6A indicating a new device group is clicked when a new device group is registered.
Figure 23B:
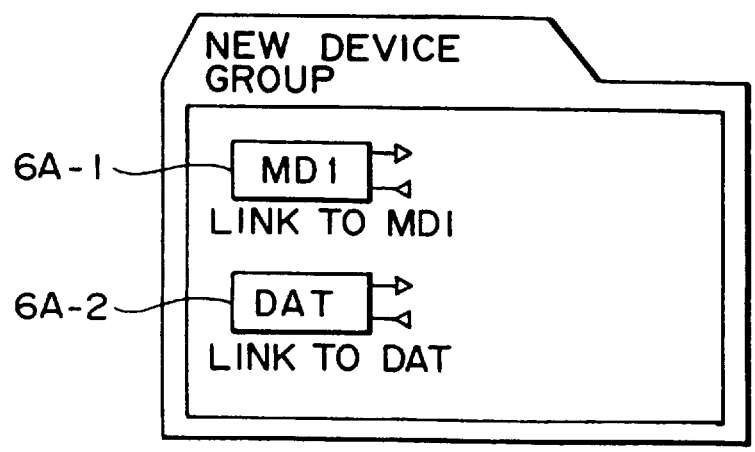

As explained above, after a new device group is formed, when the pointer 211 is moved on the icon 6A indicating a new device group and the left button 14 of the mouse 13 is clicked twice (button is depressed two times continuously) as shown in FIG. 23A, the window shown in FIG. 23B is displayed on the screen. Thereby, it is possible to know the AV devices included in the new device group. In this display example, the icon 6A-1 indicating the MD player module 3 and the icon 6A-2 indicating the DAT player module 5 are displayed.

Since the name "New Device Group" of the icon 6A can be changed to another name, a plurality of such device groups may also be registered.

Next, the process for copying the information to a new device group formed as explained above from the predetermined AV device will be explained hereunder.

Figure 24:
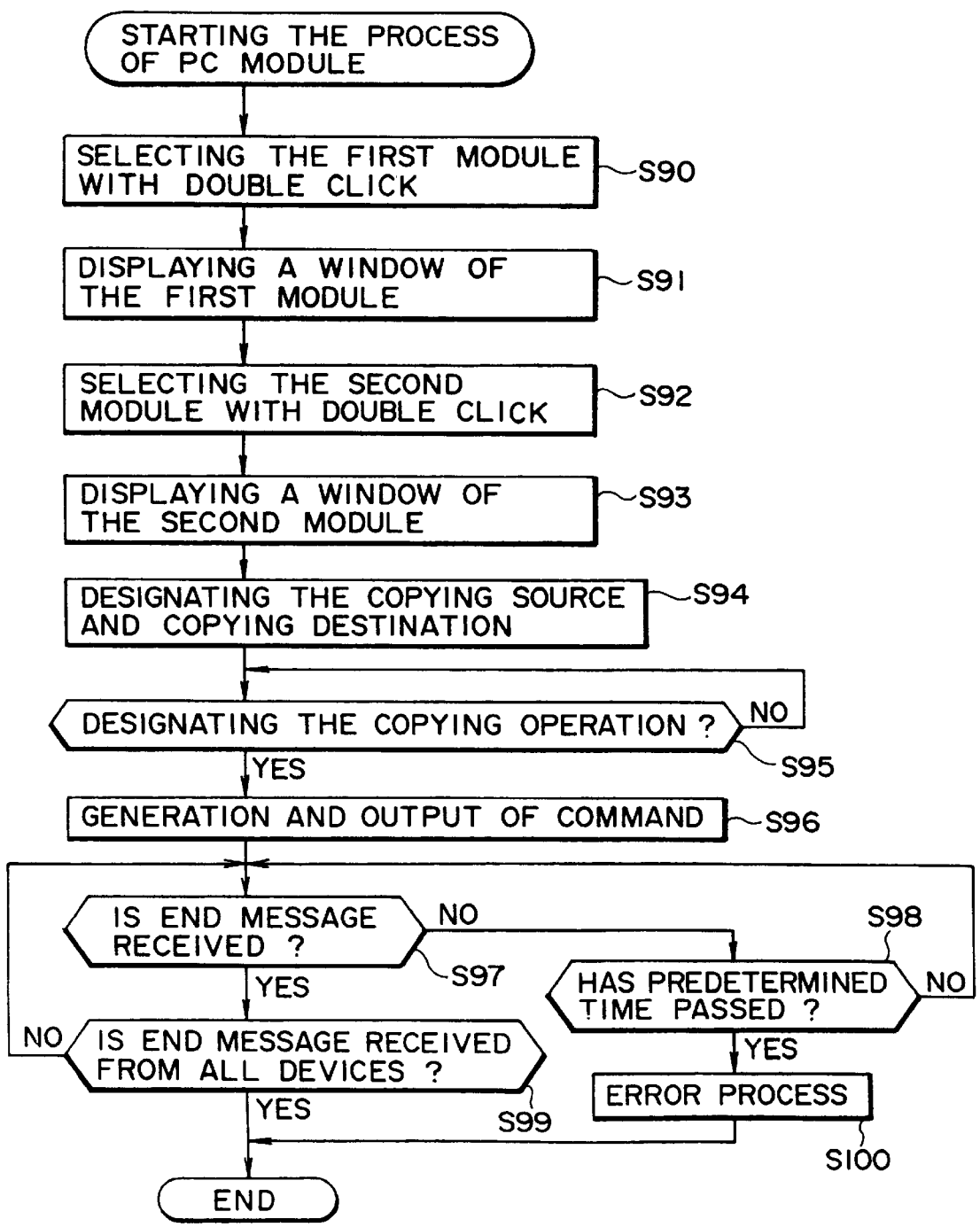
FIG. 24 is a flowchart for explaining an example of the process executed when information is copied to the other module from a certain module.

FIG. 24 is a flowchart for explaining an example of the process to be executed by the PC module 1. When this process is executed, CPU 351 of the PC module 1 inputs a first module (AV device) designated by double-click of the left button 14 of the mouse 13 in the step S90. Proceeding to the step S91, CPU 351 displays the windows corresponding to the first module.

Here, when it is assumed that the icon 4A corresponding to the CD player module 2 is selected as the first module, for example, a window 8A showing a list of the information recorded in the CD 124 currently loaded in the CD player module 2 is displayed. In this example, the icon of the musical note indicating the recorded information is music is displayed and music names "Nightmare", "Stigma" and "Addictive" are also displayed in the right side of the icon.

Returning to FIG. 24, in step S92, the CPU 351 inputs the second module designated by double-click of the left button 14 of the mouse 13. Proceeding to the step S93, CPU 351 displays the window corresponding to the second module on the monitor 11.

For example, when the icon 6A corresponding to the new device group is selected as the second module, the window 9A indicating that DAT 154 loaded in current to the DAT player module 5 is a blank tape and MD 134 loaded in current to the MD player module 3 is also a blank disc is displayed as shown in FIG. 25.

Returning to FIG. 24, in the step S94, CPU 351 receives an input designating the copying source and copying destination. For example, it is assumed that the pointer 211 is moved up to the tag (projected part on which characters "CD" are displayed) of the window 8A and the left button 14 is depressed, thereafter the pointer 211 is dragged under this condition up to the tag (projected part on which the characters "new device group" are displayed) of the window 9A and the left button 14 is released here. In this case, CD 124 of the CD player module 2 is designated as the copying source and DAT 154 of DAT player module 5 and MD 134 of MD player module 3 are designated as the copying destination. Moreover, as the information as the copying object, all pieces of information (music) recorded in the CD 124 are selected.

In above example, all pieces of music are defined as the copying object, but it is also possible to select only the designated pieces of music as the copying object by selecting the predetermined pieces of music in the window 8A.

In the step S95, CPU 351 judges whether an input for executing the copying operation is input or not. Namely, in the window (refer to FIG. 25B) displayed by the single click of the right button 15 in the display image on the monitor 11, it is judged whether left button 14 is clicked once for the process item "Copy" or not. As a result, when copy is judged not to be designated (NO), the process similar to that explained above is repeated after returning to the step S95. When copy is designated (YES), the process proceeds to the step S96.

In the step S96, CPU 351 produces a command for executing the copying process and transmits this command to the 1394-cable 7 via the 1394-interface 357. An example of the command generated in this case is shown in FIG. 26A.

Figure 26B:
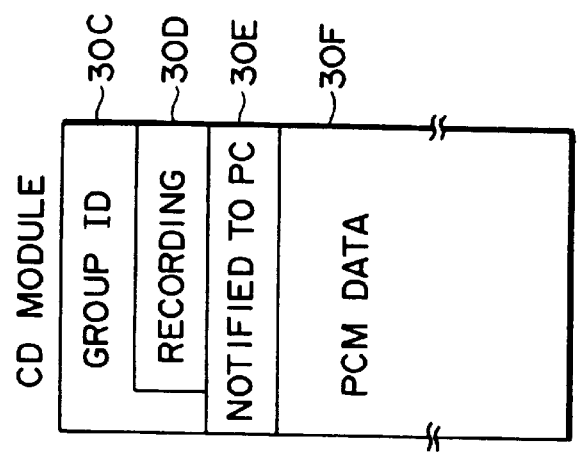
FIGS. 26A to 26C show an example of a command transmitted from the PC module 1 when the process of FIG. 24 is executed.
Figure 26C:
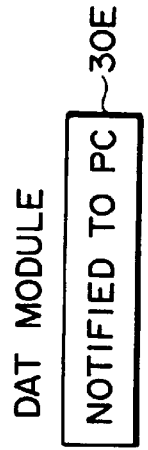
Figure 26A:
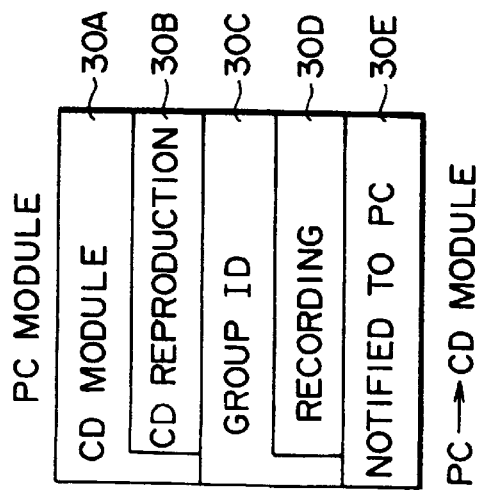
Figure 26C:
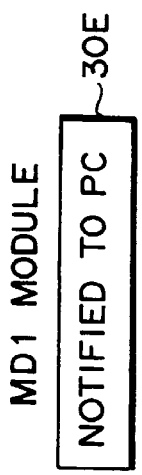

An embodiment shown in FIG. 26A is composed of the command (30A, 30B) for the CD player module 2 and the command (30C, 30D, 30E) for the new device group. The command for the CD player module 2 is composed of the destination field 30A for designating the CD player module 2 and the command field 30B storing the command. Moreover, the command for the new device group is composed of the destination field 30C for storing the group ID for designating the new device group, command field 30D for storing the command and the field 30E to instruct notification of the process end to the PC module 1 when the process is completed.

When the command explained above is transmitted from the PC module 1, the CD player module 2 starts reproduction of the CD 124 and the MD player module 3 and DAT player module 5 can record the reproduced data output via the 1394-cable 7.

When the recording process completes (copying of CD 124 is completed) in the MD player module 3 and DAT player module 5, these AV devices transmit the data indicating the end of the process to the PC module 1.

In this case, the PC module 1 judges, in the step S97, whether end of process is notified or not. As a result, when it is judged end of process is not yet notified (NO), the process proceeds to the step S98. When it is judged end of process is notified (YES), the process proceeds to the step S99.

In the step S99, it is judged whether end of process is notified from all devices or not. When it is judged end of process is not yet notified from all devices (NO), the process similar to that explained above is repeated by returning to the step S97. When it is judged end of process is notified from all devices (YES), the process is completed (End).

Moreover, when it is judged that end of process is not yet notified (NO) in the step S97, it is judged whether the predetermined time has passed or not by proceeding to the step S98. As a result, when it is judged the predetermined time has not passed (NO), the process similar to that explained above is repeated by returning to the step S97. Moreover, when it is judged the predetermined time has passed (YES), the process proceeds to the step S100.

In the step S100, an error process is executed and the process is completed (end) after, for example, a message indicating that a time-out error is generated is displayed on the monitor 11.

Next, the process to be executed in the CD player module 2, MD player module 3 and DAT module 5 when the above process is executed in the PC module 1 will be explained with reference to the flowcharts shown in FIG. 27 to FIG. 29.

Figure 27:
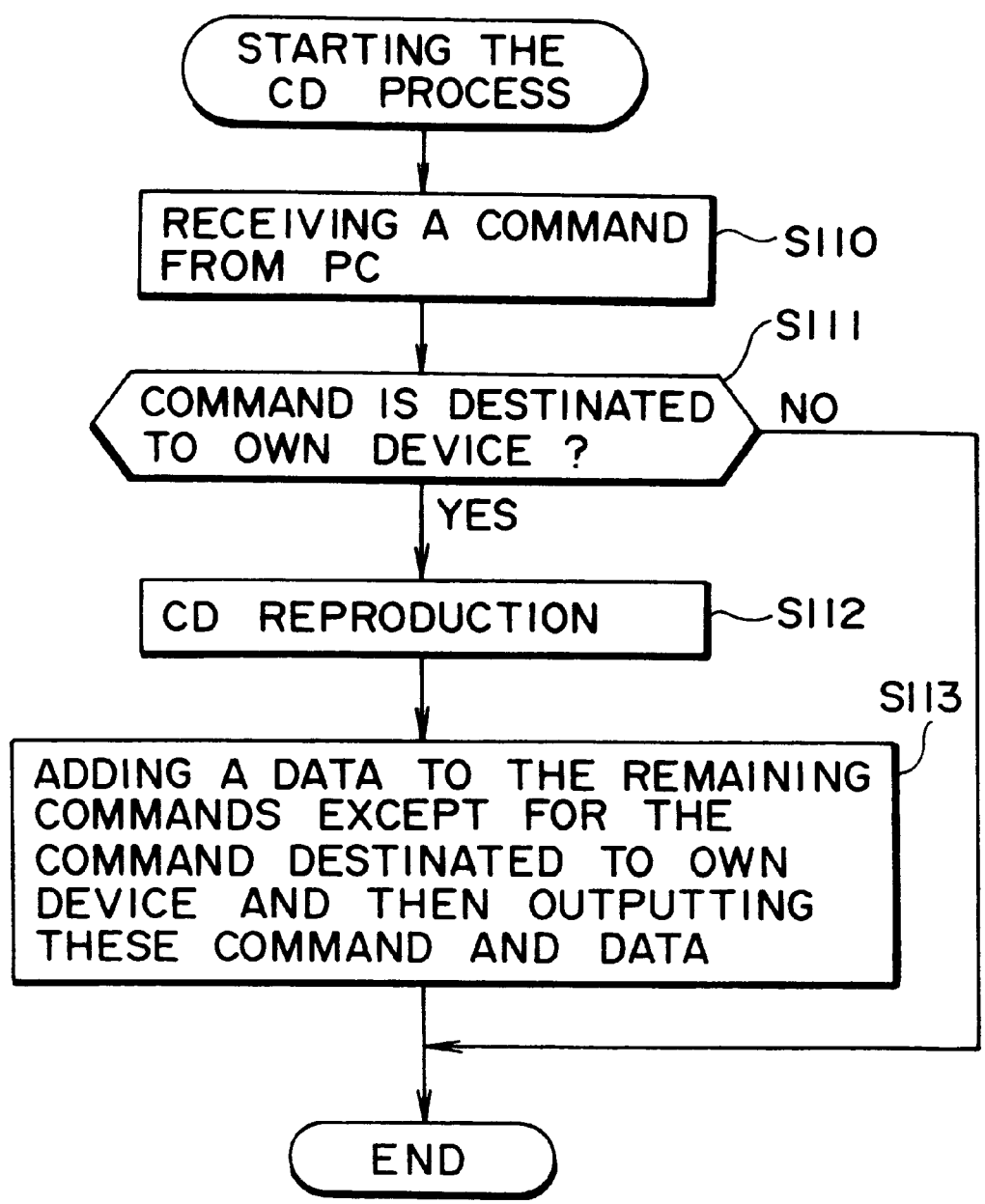
FIG. 27 is a flowchart for explaining an example of the process executed in the CD player module 2 when the process of FIG. 24 is executed.

FIG. 27 shows a flowchart for explaining an example of the process to be executed in the CD player module 2. When this process is executed, CPU 120 of the CD player module 2 receives, via the 1394-interface 125, in the step S110, the command (refer to FIG. 26A) transmitted from the PC module 1 via the 1394-cable 7. Then, the process proceeds to the step S111.

In the step S111, CPU 120 judges whether the command received is directed to own device or not. Namely, CPU 120 judges whether the command received is directed to own device or not by searching the destination fields 30A, 30C of the received command. As a result, when it is judged the command received is not directed to own device (NO), the process is completed (End). On the other hand, when it is judged that the command received is directed to own device (YES), the process proceeds to the step S112.

Since the command received by the CD player module 2 stores the data designating the CD player module 2 in its destination field 30A as shown in FIG. 26, judging result is YES in the step S111 and the process proceeds to the step S112.

In the step S112, CPU 120 extracts the data from the command field and executes the process depending on the extracted data.

Here, since the data designating reproduction of CD 124 is stored in the command field 30B corresponding to the CD player module 2 as shown in FIG. 26A, reproduction of CD 124 is started in the step S112.

In the subsequent step S113, CPU 120 adds the reproduced data (PCM data) to the commands (30C to 30E) except for the command directed to own device and transmits the data to the 1394-cable 7 via the 1394-interface.

Referring to FIG. 26A, the data regarding the CD player module 2 is isolated and the data to which the reproduced data is added is shown in FIG. 26B. In this example, the data (30A, 30B) regarding the CD player module 2 is isolated and the reproduced PCM data 30F is added.

Such data is transmitted to the next AV device (MD player module 3) via the cable 7.

Figure 28:
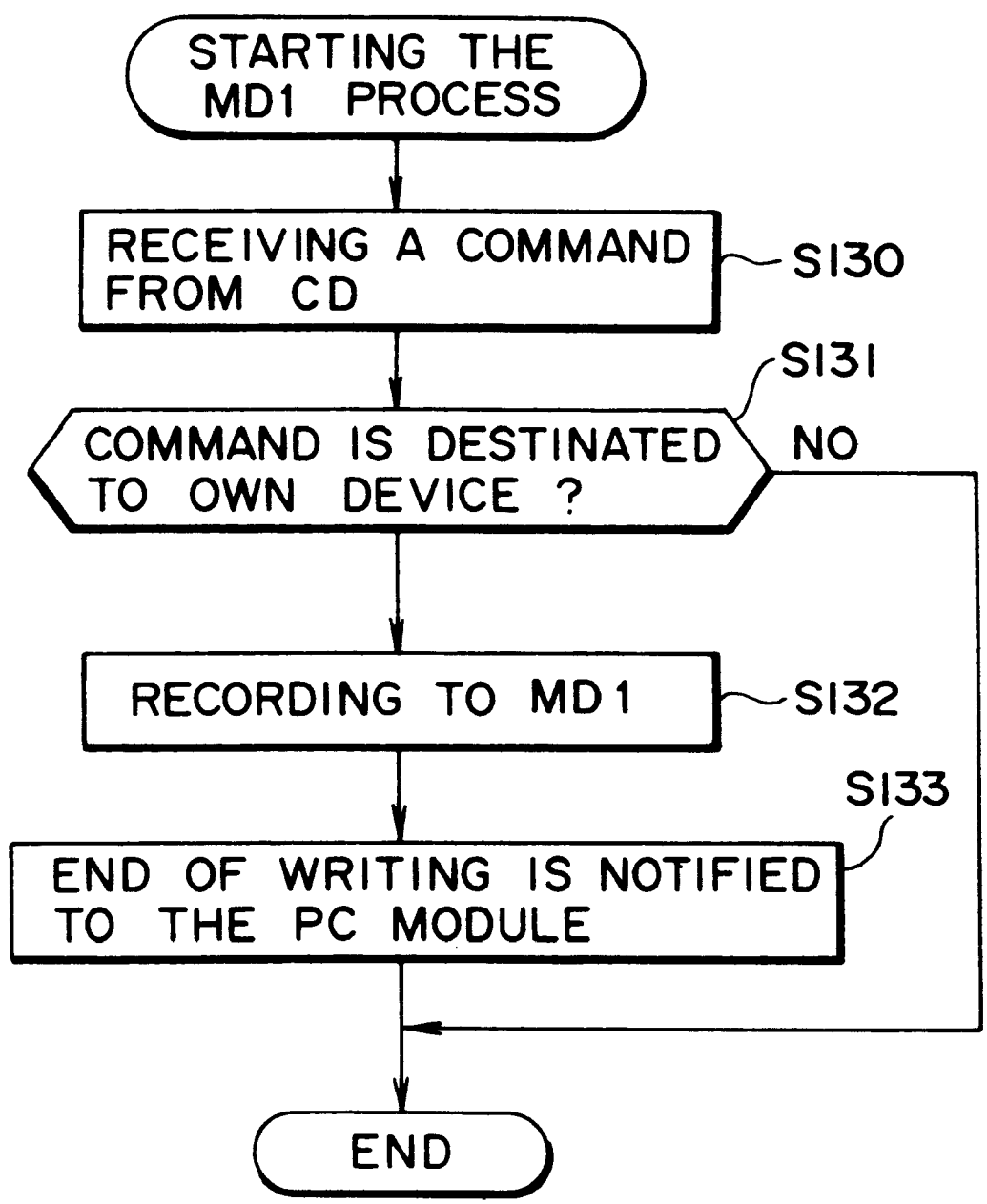
FIG. 28 is a flowchart for explaining an example of the process executed in the MD player module 3 when the process of FIG. 24 is executed.

FIG. 28 shows a flowchart for explaining an example of the process to be executed by the MD player module 3. When this process is executed, CPU 130 of the MD player module 3 receives, in the step S130, the command (refer to FIG. 26B) transmitted from the CD player module 2. Proceeding to the step S131, it is judged whether the command received is directed to own device or not. As a result, when the command is judged not to be directed to own device (NO), the process is completed (End) and when the command is judged to be directed to own device (YES), the process proceeds to the step S132.

In the step S132, CPU 130 extracts data from the command field 30D shown in FIG. 26B and receives and records the PCM data 30F reproduced in the CD player module 2 depending on such data.

Upon completion of recording process, the process skips to the step S133 and the data shown in FIG. 26C indicating that the process is completed is transmitted to the PC module 1 depending on the data stored in the field 30E to complete the process (End).

A similar process is also executed in the DAT player module 5. FIG. 29 shows a flowchart for explaining the process to be executed in the DAT player module 5.

When this process is executed, CPU 150 of the DAT player module 5 in the step S150 receives the command (refer to FIG. 26B) received via the MD player module 3.

In the subsequent step S151, CPU 150 judges whether the command received is directed to own device or not. As a result, when the command is judged not be directed to own device (NO), the process is completed and when the command is judged to be directed to own device (YES), the process proceeds to the step S152.

Here, the DAT player module 5 stores the new device group ID (for example, "200", etc. shown in FIG. 22) received by the process of step S72 shown in FIG. 21. Moreover, as shown in FIG. 26B, the command gives the group ID (=200), judging result in the step S151 is YES and the process proceeds to the step S152.

In the step S152, CPU 150 extracts the data from the command field 30D shown in FIG. 26B and executes, depending on this data, the process for receiving and recording the PCM data 30F reproduced from the CD player module 2.

Figure 29:
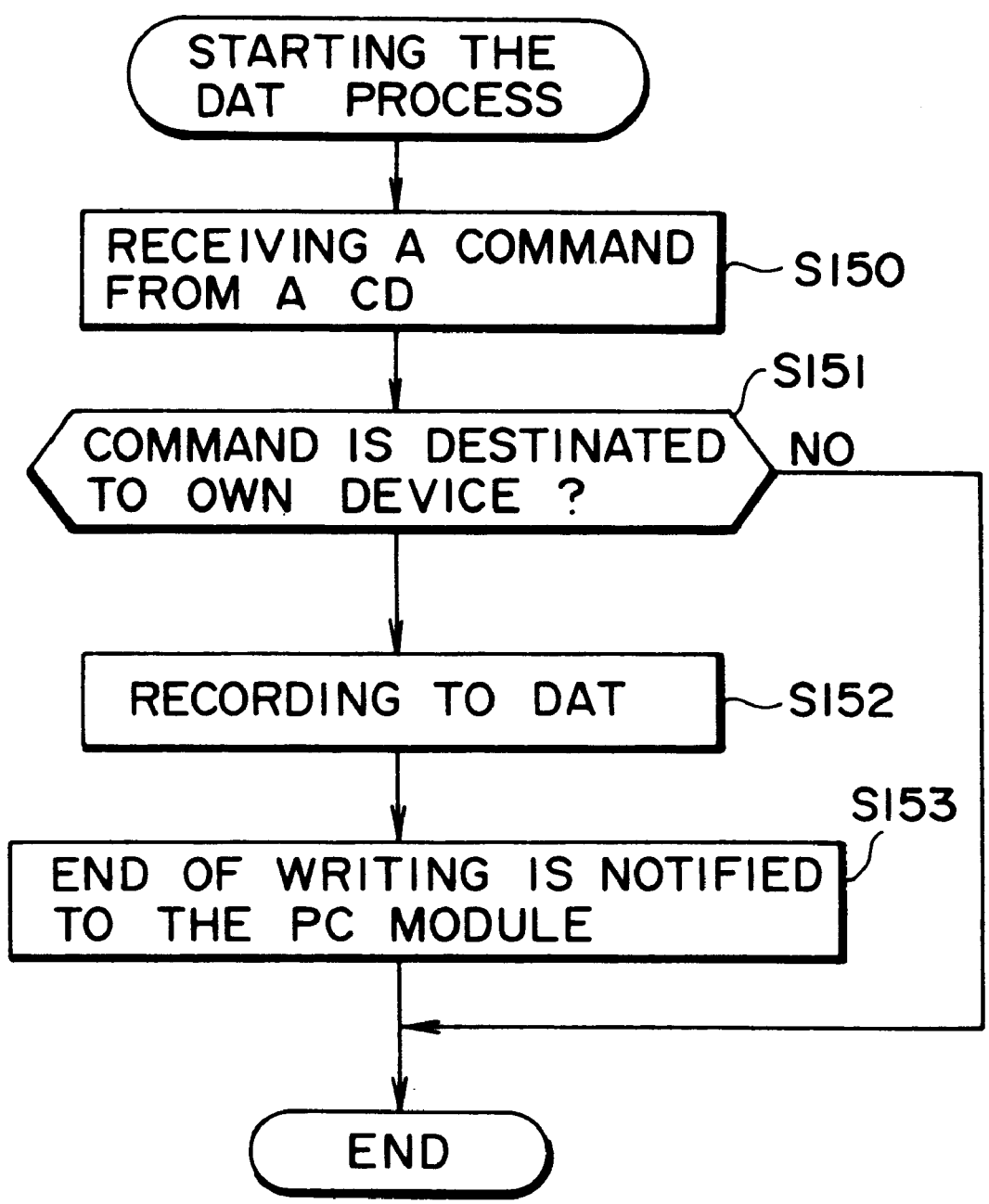
FIG. 29 is a flowchart for explaining an example of an example of the process executed in the DAT player module 5 when the process of FIG. 24 is executed.

Upon completion of the recording process, the process proceeds to the step S153 and the data indicating that the process shown in FIG. 29 is completed is transmitted to the PC module 1 to complete the process (End).

Upon reception of the data indicating the completion of the processes returned from the MD player module 3 and DAT player module 5, the PC module 1 judges YES in the step S99 and completes the process (End).

According to above processes, in the case where the information is copied, for example, to the group from the other AV device, information can be copied, by the single copying process, to all AV devices registered to the group by registering a plurality of AV devices to one group on the monitor 11 of the PC module 1. In the 1394-interface, since the information is basically transmitted and received by the digital signal, when the output format in the function unit in the copying source is identical to the input format in the function unit in the copying destination, the information is copied by the digital signal and deterioration of information can be eliminated.

Figure 25A:
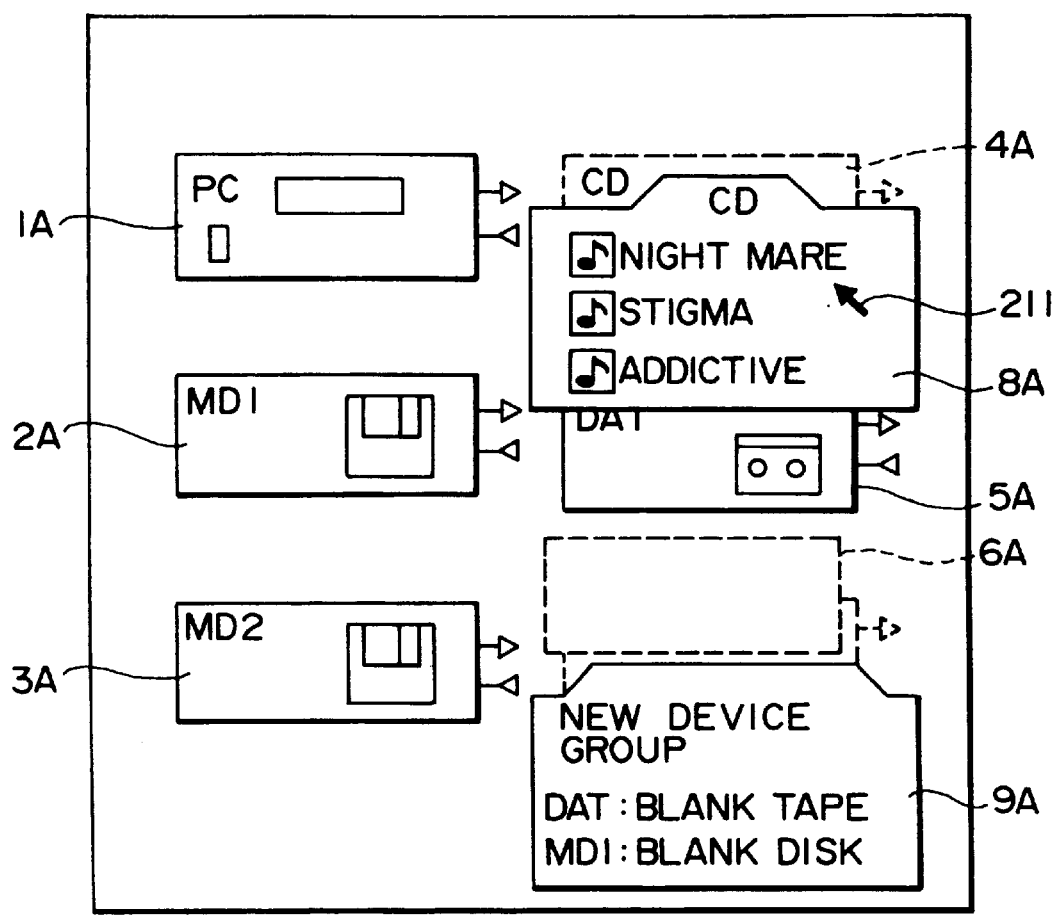
FIGS. 25A and 25B show a display example of the display image displayed when the process of FIG. 24 is executed.
Figure 25B:
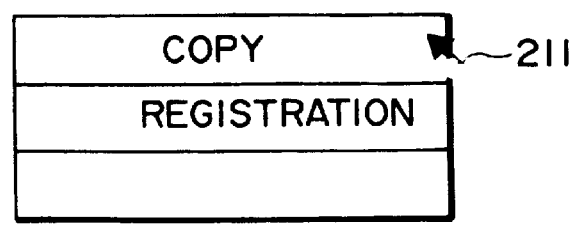
Figure 30A:
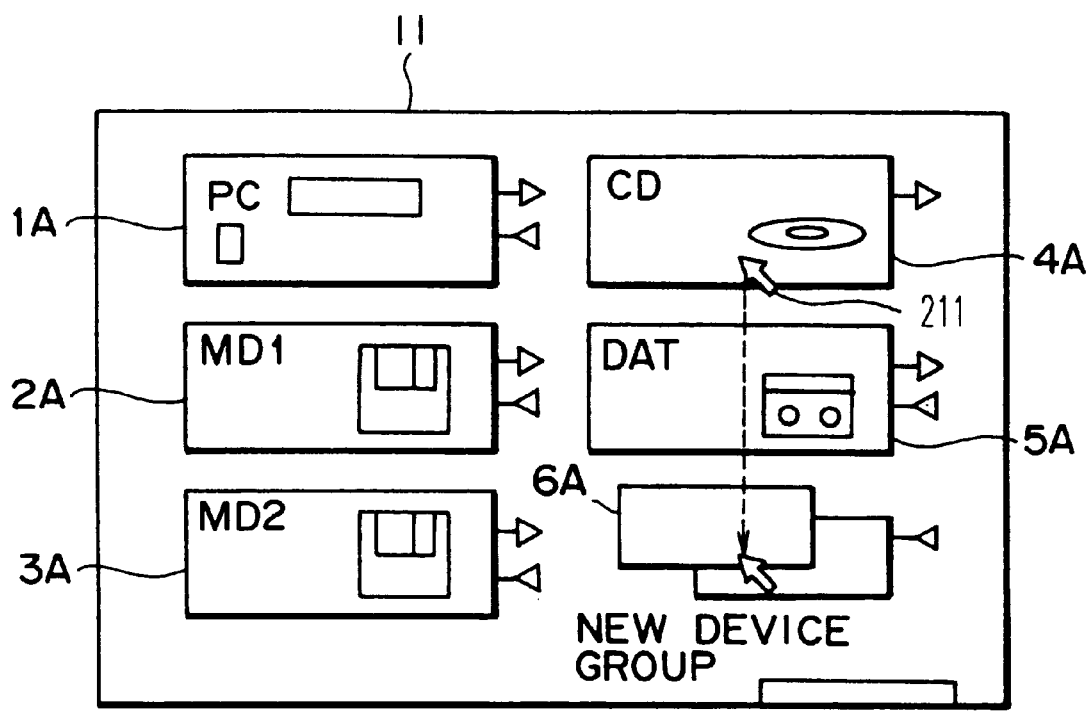
FIGS. 30A and 30B show the other display example of the display image displayed when the process of FIG. 24 is executed.

In above embodiments, the desired information is designated by drag and drop after designating the devices of the copying source and copying destination as shown in FIG. 25A. However, for example, as shown in FIG. 30, it is also possible to entirely copy the information stored in the CD 124 by dragging and dropping the icon of the copying source (icon 4A for the CD player module 2 in this example) to the icon of the copying destination (icon 6A for the new device group in this example).

In the sequence of this process, first, after the icon 4A corresponding to the CD player module 2 as the copying source is designated by the pointer 211, the pointer is moved down to the icon 6A corresponding to the new device group while the left button 14 of the mouse 13 is depressed. The, the left button 14 is released. As a result, the CD player module 2 is designated as the copying source and the MD player module 3 and DAT player module 5 registered to the new device group are designated as the copying destination.

Figure 30B:
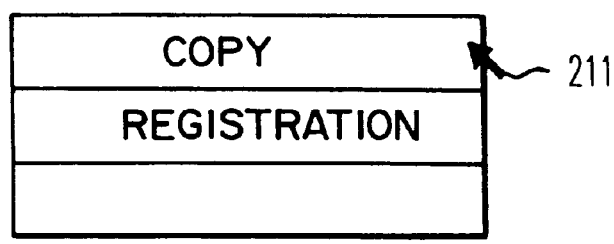

Subsequently, the window shown in FIG. 30B can be displayed by clicking once the right button 15 at the predetermined position on the display image and the first item of this window "Copy" is designated with the pointer 211. Thereafter, the left button 14 is clicked once. As a result, the information recorded in the CD 124 of the CD player module 2 is entirely copied to the MD 134 of the MD player module 3 and DAT 154 of the DAT player module 5.

In above embodiments, copying of the audio information has been explained, but the present invention is not limited thereto. For example, the present invention can naturally be applied for the copying of the video data and computer programs.

American issued number U.S. Pat. No. 5,563,886, U.S. 5,621,659, U.S. 5,631,850, U.S. 5,640,992, U.S. 5,689,244 or U.S. 5,710,778 which are disclosed relating the technology of IEEE1394. Each of the above applications are owned by the assignee of the present invention and incorporated by reference.

What is claimed is:

1. An electronic device controller being connected with a plurality of electronic devices via a network, comprising:

communication means for making communication with said plurality of electronic devices via said network;

requesting means for requesting, from each of said plurality of electronic devices, transmission of function information, wherein said function information includes information indicating a function unit of a plurality of function units and information indicating at least one of an input format and an output format corresponding to said each electronic device;

first memory means for storing said function information transmitted via said network from said each electronic device;

forming means for forming a function group by forming a plurality of said function information stored in said first memory means; and second memory means for storing function group information of said function group formed by said forming means, wherein data can be copied to all function units of said function group with a single designation operation.

2. An electronic device controller according to claim 1, further comprising selecting means for selecting at least one of said plurality of function units and for selecting said function group.

3. An electronic device controller according to claim 2, wherein said data transmitted from the selected at least one function unit is distributed to all function units forming said function group in such a case that the selected function unit is selected as a transmitting side of said data and said function group is selected as a receiving side of said data.

4. An electronic device controller according to claim 3, wherein said selecting means executes a selection by dragging and dropping an icon corresponding to said transmitting side toward another icon corresponding to said receiving side.

5. An electronic device controller according to claim 2, further comprising:

producing means for producing commands to execute predetermined processes in the selected at least one function unit or in each function unit forming said function group; and output means for outputting the produced commands to said network.

6. An electronic device controller according to claim 5, wherein said producing means includes, with said commands, designation information for designating a next function unit of said plurality of function units to be executed next after a current function unit of said plurality of function units has executed said predetermined processes.

7. An electronic device controller according to claim 6, wherein said designation information includes group designation information for designating said all function units forming said function group.

8. An electronic device controller according to claim 5, further comprising verifying means for verifying end information that is generated when said current function unit has completed said predetermined processes corresponding to said commands.

9. An electronic device controller according to claim 1, further comprising output means for outputting and displaying said function information stored in said first memory means and said function group information stored in said second memory means.

10. An electronic device controller according to claim 1, wherein said each electronic device is an audio-visual device and said network is an IEEE-1394 network.

11. An electronic device control method for controlling a plurality of electronic devices connected via a network, comprising:

communication step for making communication with said plurality of electronic devices via said network;

requesting step for requesting, from each of said plurality of electronic devices, transmission of function information, wherein said function information includes information indicating a function unit of a plurality of function units and information indicating at least one of an input format and an output format corresponding to said each electronic device;

first storing step for storing said function information transmitted from said each electronic device via said network;

forming step for forming a function group by combining a plurality of said function information stored in said first storing step; and second storing step for storing function group information of said function group formed by said forming step, wherein data can be copied to all function units of said function group with a single designation operation.

12. An electronic device connected to an electronic device controller via a network, comprising:

communication means for making communication with said electronic device controller via said network;

first memory means for storing function information, wherein said function information includes information indicating at least one function unit of said electronic device and information indicating at least one of an input format and an output format corresponding to each said at least one function unit;

transmitting means for transmitting, from said electronic device, said function information to said electronic device controller when a request for transmission of said function information is received; and second memory means for storing function group information when said function group information to which said electronic device belongs is received from said electronic device controller, wherein data can be copied to all function units of said function group with a single designation operation.

13. An electronic device according to claim 12, further comprising:

extracting means for extracting a designation information included in a command when the command is transmitted from said electronic device controller;

comparing means for comparing, when a group designation information is included in said designation information extracted by said extracting means, said group designation information with said function group information stored in said second memory means; and executing means for executing said command depending on a comparison result of said comparing means.

14. An electronic device according to claim 13, further comprising output means for adding, when a process corresponding to said command is completed, data obtained as a result of said process to the command from said electronic device controller and then outputting said data to a next electronic device.

15. An electronic device according to claim 14, wherein said output means further notifies an end of said process to said electronic device controller when the process corresponding to said command is completed in a case where said next electronic does not exist.

16. An electronic device control method of controlling each electronic device of a plurality of electronic devices connected to an electronic device controller via a network, comprising:

communication step for making communication from said each electronic device to said electronic device controller via said network;

first storing step for storing, in said each electronic device, function information, wherein said function information includes information indicating at least one function unit of said each electronic device and information indicating at least one of an input format and an output format corresponding to said at least one function unit;

transmission step for transmitting, from said each electronic device, said function information to said electronic device controller when a request for transmission of said function information is received from said electronic device controller; and second storing step for storing, in said each electronic device, function group information when said function group information of a function group to which said each electronic device belongs is received from said electronic device controller, wherein data can be copied to all function units of said function group with a single designation operation.

17. An electronic device control system formed of a plurality of electronic devices controlled via a network and a master electronic device for controlling said plurality of electronic devices, wherein said master electronic device comprises:

first communication means for making communication with said plurality of electronic devices via said network;

requesting means for requesting, from each of said plurality of electronic devices, transmission of function information, wherein said function information includes information indicating a function unit of a plurality of function units and information indicating at least one of an input format and an output format corresponding to said each electronic device;

first memory means for storing said function information transmitted from said plurality of electronic devices via said network;

forming means for forming a function group by combining a plurality of said function information stored in said first memory means; and second memory means for storing function group information of said function group formed by said forming means; and wherein said plurality of electronic devices each comprises:

second communication means for making communication with said master electronic device via said network;

third memory means for storing said function information associated with said each electronic device;

transmitting means for transmitting said function information to said master electronic device when a request for transmission of said function information is received from said master electronic device; and fourth memory means for storing said function group information when said function group information to which said each electronic device belongs is received from said master electronic device, wherein data can be copied to all function units of said function group with a single designation operation.

18. An electronic device control method of an electronic device control system formed of a plurality of electronic devices connected via a network and a master electronic device for controlling said plurality of electronic devices, comprising:

first communication step for making communication from said master electronic device to said plurality of electronic devices via said network;

requesting step for requesting, from each of said plurality of electronic devices, transmission of function information, wherein said function information includes information indicating a function unit of a plurality of function units and information indicating at least one of an input format and an output format corresponding to said each electronic device;

first storing step for storing, in said master electronic device, said function information transmitted from said plurality of electronic devices via said network;

forming step for forming, in said master electronic device, a function group by combining a plurality of said function information stored in said first storing step;

second storing step for storing, said master electronic device, function group information of said function group formed by said forming step;

second communication step for making communication from said each electronic device to said master electronic device via said network;

third storing step for storing, in said each electronic device, said function information associated therewith;

transmission step for transmitting, from said each electronic device, said function information to said master electronic device when a request for transmission of said function information is received from said master electronic device; and fourth storing step for storing, in said each electronic device, said function group information when said function group information to which said each electronic device belongs is received from said master electronic device, wherein data can be copied to all function units of said function group with a single designation operation.

* * * * *

UNITED STATES PATENT AND TRADEMARK OFFICE
CERTIFICATE OF CORRECTION

PATENT NO. : 6,253,114 B1
DATED : June 26, 2001
INVENTOR(S) : Masahiro Takihara

It is certified that error appears in the above-identified patent and that said Letters Patent is hereby corrected as shown below:

Column 3,
Line 59, "an" to -- a --.

Column 6,
Line 67, delete commas (second and third occurrences).

Column 7,
Line 20, change "the" to -- an --.

Column 9,
Line 5, change "module" (second occurrence) to -- modules --.

Column 17,
Line 12, change "The," to -- Then --.
Line 32, delete "which".

Signed and Sealed this

Thirtieth Day of April, 2002

Attest:

*Attesting Officer*

JAMES E. ROGAN
*Director of the United States Patent and Trademark Office*